United States Patent [19]

Kinoshita et al.

[11] Patent Number: 4,912,570
[45] Date of Patent: Mar. 27, 1990

[54] RECORDING AND/OR REPRODUCING DEVICE

[75] Inventors: Takao Kinoshita; Kazuhiko Ito, both of Tokyo; Shigeo Yamagata, Kawasaki, all of Japan

[73] Assignee: Canon Kabushiki Kaisha, Tokyo, Japan

[21] Appl. No.: 368,148

[22] Filed: Jun. 15, 1989

Related U.S. Application Data

[63] Continuation of Ser. No. 936,745, Dec. 2, 1986, abandoned.

[30] Foreign Application Priority Data

| Dec. 2, 1985 | [JP] | Japan | 60-269428 |
| Dec. 23, 1985 | [JP] | Japan | 60-287852 |
| Dec. 25, 1985 | [JP] | Japan | 60-290387 |
| Dec. 25, 1985 | [JP] | Japan | 60-290388 |
| Dec. 25, 1985 | [JP] | Japan | 60-290389 |

[51] Int. Cl.⁴ ............................................. G11B 5/00
[52] U.S. Cl. .......................................................... 360/8
[58] Field of Search .................................. 360/8, 6, 51

[56] References Cited

U.S. PATENT DOCUMENTS

| 3,828,361 | 8/1974 | Schiffman | 360/8 |
| 4,032,224 | 6/1977 | Wray | 360/8 |
| 4,413,289 | 11/1983 | Weaver et al. | 360/51 |
| 4,449,154 | 5/1984 | Ohnishi et al. | 360/51 |
| 4,620,238 | 10/1986 | Gaskell et al. | 360/8 |
| 4,722,009 | 1/1988 | Nakama et al. | 360/8 |

Primary Examiner—Russell E. Adams
Attorney, Agent, or Firm—Fitzpatrick, Cella, Harper & Scinto

[57] ABSTRACT

A recording and/or reproducing apparatus includes a plurality of time base changing elements arranged to perform band compression and expansion by altering the time base of an incoming signal; a switching circuit arranged to selectively change audio signals inputted into and outputted from these time base changing elements from one over to another; and a recording-and-reproducing circuit arranged to record and reproduce the band compressed audio signal on and from a recording medium.

26 Claims, 12 Drawing Sheets

RECORDING AND/OR REPRODUCING DEVICE

This application is a continuation of application Ser. No. 936,745, filed Dec. 2, 1986, now abandoned.

BACKGROUND OF THE INVENTION:

1. Field of the Invention:

This invention relates to a recording and/or reproducing apparatus for recording and/or reproducing an audio signal on or from a recording medium such as a magnetic sheet along with a video signal.

2. Description of the Related Art:

Recording and/or reproducing apparatus such as a video disc recorder or a video sheet recorder have been arranged to use a rotary recording medium such as an optical disc or magnetic sheet and to record a composite video signal through a television tuner, a video camera or the like while forming circular recording tracks on the medium. This arrangement is highly suited for recording a still picture or image. The video signal thus recorded is reproduced by a reproducing device. For example, with a television receiver connected to the reproducing device, a still image can be displayed. The reproduced image also can be printed as a hard copy with a printer connected thereto or can be transmitted by the medium of a facsimile system.

The recording medium is arranged to permit recording thereon not only of the video signal but also a band compressed audio signal. Therefore, with a band compressed audio signal recorded at a part of the recording medium, for example, the operator can have a still picture reproduced with a sound by expanding the compressed audio signal and reproducing it along with a related video signal during a reproducing operation. However, the conventional recording and/or reproducing apparatus has necessitated analog-to-digital (A/D) and digital-to-analog (D/A) conversion for the band compression and expansion of the audio signal. Therefore, the number of circuit components for audio signal recording and reproduction thus has increased and resulted in an increased cost of the conventional recording and/or reproducing apparatus.

SUMMARY OF THE INVENTION

It is a first object of this invention to provide a recording and/or reproducing apparatus which solves the above-stated problem of the prior art and is arranged to be capable of accomplishing the band compression and expansion of an audio signal without necessitating any A/D and D/A converting processes.

It is a second object of this invention to provide a recording and/or reproducing apparatus which is capable of accomplishing the band compression and expansion of an audio signal with a simple arrangement.

To accomplish this object, a recording and/or reproducing apparatus arranged according to this invention as a preferred embodiment thereof comprises a plurality of time base changing elements which perform band compression and expansion by changing the time base of an incoming audio signal; switching means for selectively switching the input and output of the audio signal to and from each of the time base changing elements; and recording and/or reproducing means arranged to record or reproduce the band compressed audio signal on or from a recording medium.

It is another object of this invention to provide a recording apparatus which, in recording an audio signal on a recording medium, is capable of also recording sounds obtained before the medium becomes ready for recording thereon.

It is a further object of this invention to provide a recording and/or reproducing apparatus which is arranged to always adequately record or reproduce both an audio signal and a video signal on the basis of a given signal.

It is a further object of the invention to provide a recording and/or reproducing apparatus which is arranged to adequately record or reproduce an audio signal and a video signal in combination with each other by means of a pair of recording and/or reproducing means.

According to this object, a recording and/or reproducing apparatus arranged according to this invention as another preferred embodiment thereof comprises a pair of recording or reproducing heads, one of which is arranged to record or reproduce a time base compressed audio signal while the other is arranged to record or reproduce a still image signal.

It is a still further object of this invention to provide a recording and/or reproducing apparatus which, in recording or reproducing an audio signal, is capable of adequately recognizing the state of a recording or reproducing operation on the audio signal.

The above and other objects and features of the invention will become apparent from the following detailed description of embodiments thereof taken in connection with the accompanying drawings.

DETAILED DESCRIPTION OF THE PREFERRED EMBODIMENTS:

In the embodiments given below, this invention is applied to still video recording and/or reproducing apparatuses. However, this invention is not limited by any of the details of the embodiments. Various changes and modifications may be made in the invention without departing from the inventive principles thereof. Further, this invention is applicable also to a recorder arranged solely to perform recording; or a reproducing apparatus arranged solely to perform reproduction as such specialized apparatus obviously fall within the scope of this invention.

Figure 1:
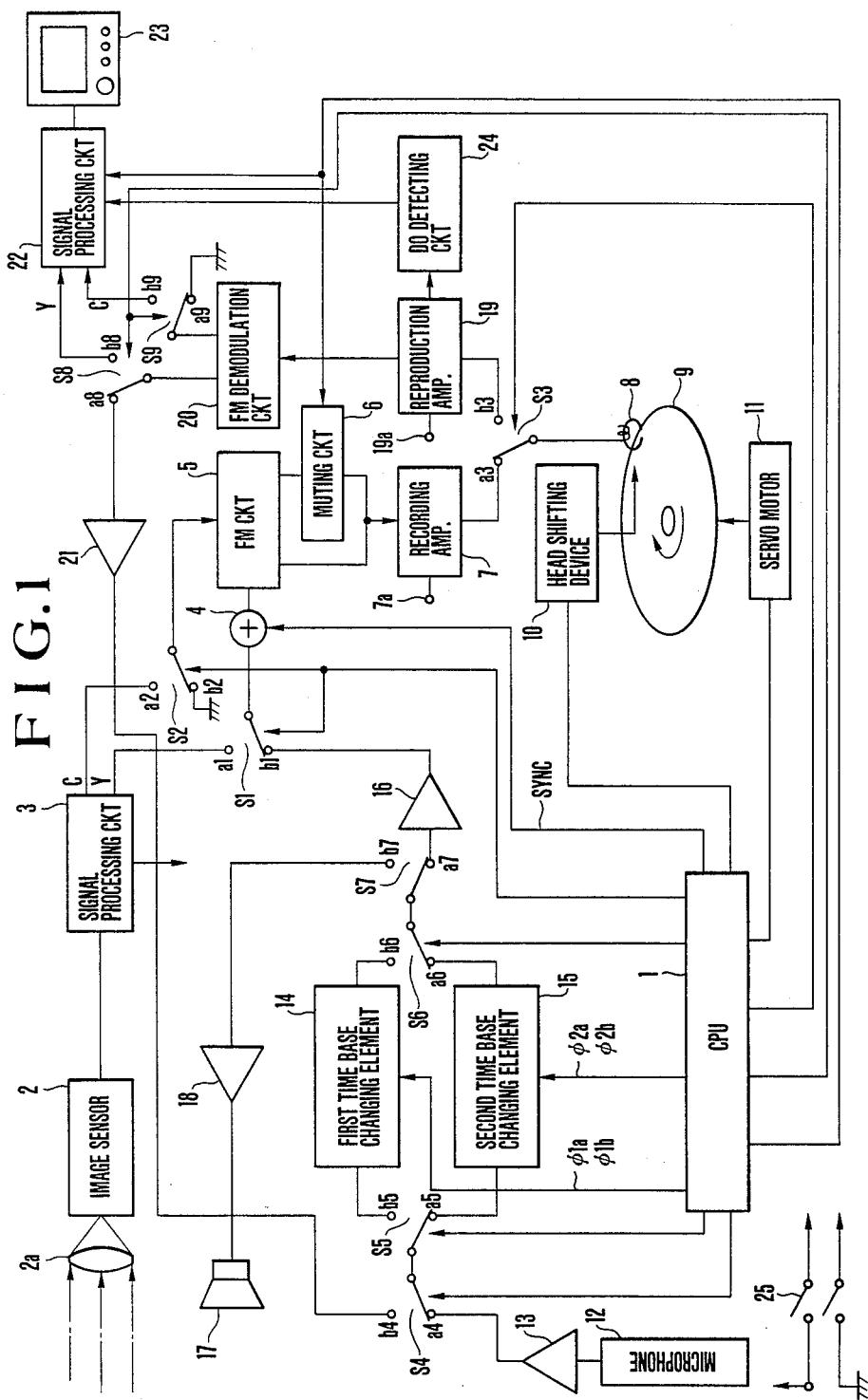
FIG. 1, is a block diagram showing the arrangement of a first embodiment of this invention.

FIG. 1 shows in a block diagram a first embodiment of this invention in which this invention is applied to a still video recording and/or reproducing apparatus.

The illustration includes a system controller 1 (hereinafter referred to as CPU for short); an image sensor 2 such as a CCD or the like which picks up an optical image coming from an optical system 2a; a signal processing circuit 3 which is arranged to perform a predetermined signal processing operation on a video signal coming from the image sensor 2 and to produce a luminance signal Y and a chrominance signal C with the output terminals thereof connected to the terminals a1 and a2 of switches S1 and S2; a mixer 4 which is connected to the change-over contact of the switch S1; and a frequency modulation circuit 5 which is connected to the mixer 4 and the output terminal of the switch S2 and is also connected via a muting circuit 6 and a recording amplifier 7 to a terminal a3 of a switch S3. The frequency modulation (FM) circuit 5 has two carrier waves of different frequencies and modulates two inputs with these different carrier waves before its output is produced. The muting circuit 6 is arranged to turn on and off according to a signal from the CPU 1. A single magnetic head 8 is arranged to record and/or reproduce signals on or from a magnetic sheet 9 which is provided as a recording medium. The head 8 is connected to the change-over contact of the above-stated switch S3. A head shifting device 10 is arranged to radially shift the head 8 on the magnetic sheet 9 in response to a signal from the CPU 1. A servo motor 11 is arranged to rotate the magnetic sheet 9 in response to a signal from the CPU 1. A microphone 12 is arranged to convert sounds into an electrical signal (audio signal) and is connected via an amplifier 13 to the terminal a4 of a switch S4. This switch S4 has its change-over contact connected to that of another switch S5 which is disposed behind the switch S4. A first time base changing element 14 is connected to one terminal b5 of the switch S5. A second time base changing element 15 is connected to another terminal a5 of the switch S5. A switch S6 is connected to the first and second time base changing elements 14 and 15 and is arranged to form change-over means in conjunction with the switch S5. The switch S6 has one terminal b6 thereof connected to the first time base changing element 14 and another terminal a6 connected to the second time base changing element 15 respectively. The change-over contact of this switch S6 is connected to that of a switch S7 which is disposed behind the switch S6. An amplifier 16 is connected to one terminal a7 of the switch S7 and has its output terminal connected to the terminal b1 of the above-stated switch S1. A speaker 17 is connected via an amplifier 18 to another terminal b7 of the switch S7. A control input terminal 7a of the recording amplifier 7 is connected to the CPU 1. A reproduction amplifier 19 has its input terminal connected to the terminal b3 of the switch S3. The reproduction amplifier 19 is provided also with a control input terminal 19a which is connected to the CPU 1. An FM demodulation circuit 20 has its output terminals connected to the change-over contacts of switches S8 and S9 and is arranged to be capable of demodulating the signals which have been modulated with the different carrier waves. The demodulated signals are supplied separately to the switches S8 and S9 respectively. The switch S8 has one terminal a8 thereof connected via an amplifier 21 to the terminal b4 of the above-stated switch S4 and another terminal b8 connected via a signal processing circuit 22 to a monitor 23. A drop-out detecting circuit 24 (hereinafter referred to as DO detecting circuit) is arranged to detect any drop-out in the video signal produced from the above stated reproduction amplifier 19. The signal processing circuit 22 is arranged to correct the drop-out in accordance with the output of the DO detecting circuit 24. A stand-by switch 25 is connected to a power supply Vcc. Further, each of the switches S1 to S9 is arranged to have its connecting position changed from one terminal over to the other by a signal produced from the CPU 1.

Figure 2:
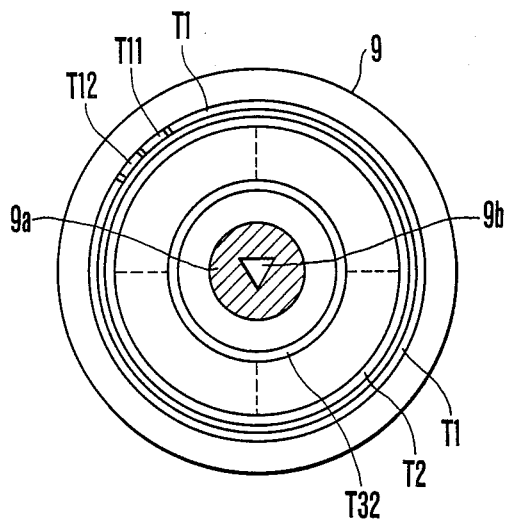
FIG. 2 is an illustration of a magnetic sheet to be used for the first embodiment of this invention.

FIG. 2 shows a magnetic sheet 9 which is to be used by the embodiment described above. The magnetic sheet 9 is provided with a center core 9a which is disposed in the middle part of the sheet 9. The center core 9a has a hole 9b which is arranged to be coupled with the spindle of the servo motor 11. Recording tracks T1 to T32 are formed in a ring shape on the magnetic sheet 9. For example, video signals which include known horizontal and vertical synchronizing signals are recorded with frequency modulation at the rate of having one field portion of the signal recorded in each of the odd number tracks among the tracks T1 to T31. Meanwhile, band compressed audio signals are recorded in the even number tracks included in the tracks T1 to T31. In this specific embodiment, the compressed audio signal is FM (frequency modulation) recorded with the horizontal and vertical synchronizing signals added thereto in the same manner as in the case of the composite video signal as will be described later in further details. Further, the innermost track T32 is arranged to have control information or data recorded therein for use at the time of reproduction. The control information includes, for example, information on the compressed audio recording signal and a video signal relative thereto; information on reproduction control to be performed when one unit of audio information extends over a plurality of recording tracks; information on a sequence in which sounds are to be reproduced; and so on. This data track may be arranged in a plural number instead of the single track T32.

Figure 4:
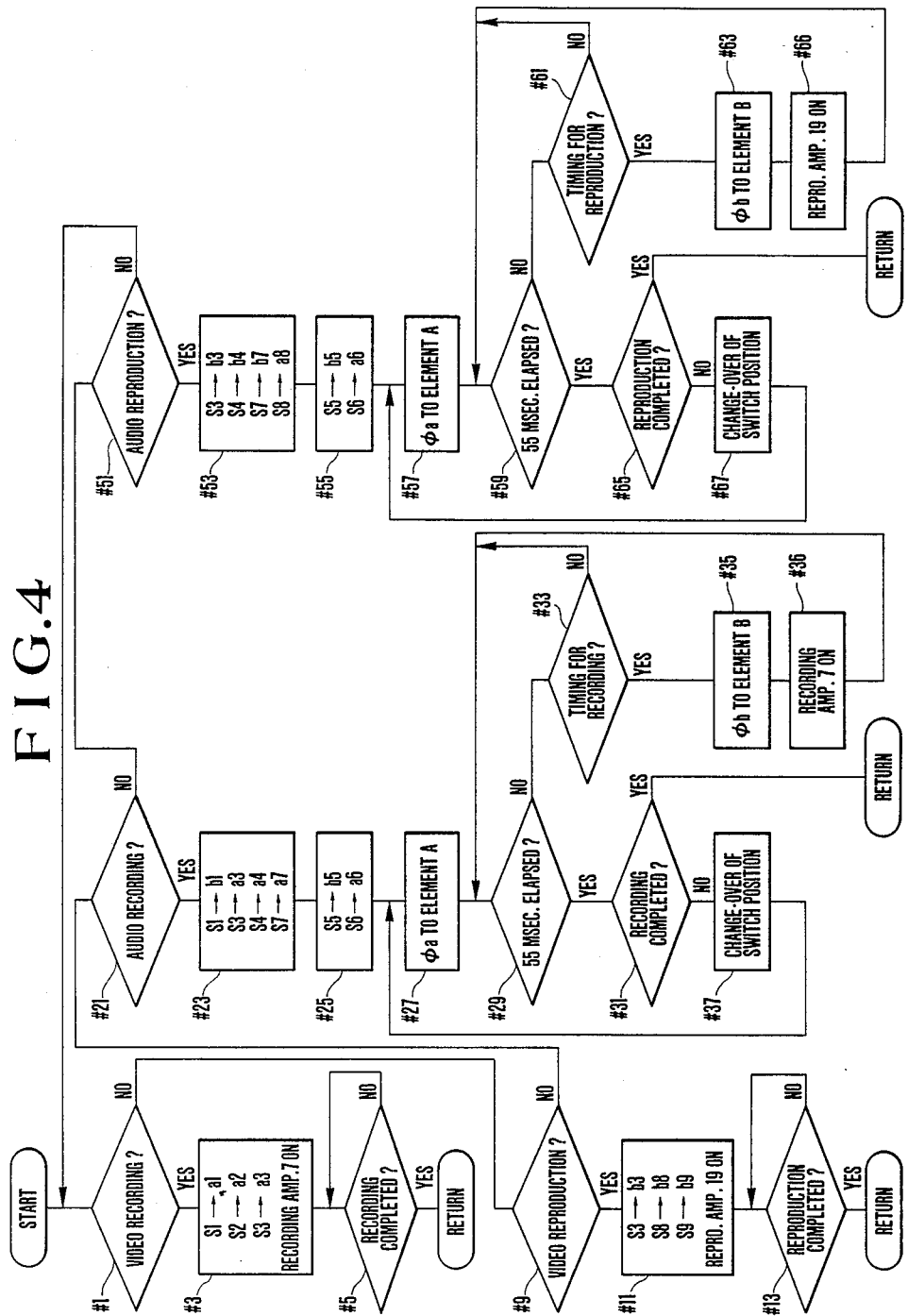
FIG. 4 is a flow chart showing the operation of a CPU 1 which is shown in FIG. 1.

With the embodiment arranged as described above, in recording or reproducing the video and audio signals, the stand-by switch 25 is first turned on and the recording or reproducing operation is performed after stabilization of the rotation of the servo motor 11. FIG. 4 is a flow chart showing the operation of the embodiment. In recording the video signal, operating means which is not shown is operated to cause a predetermined signal produced from the CPU 1 which is arranged as driving control means. Then, in response to this signal, the change-over contacts of the switches S1, S2 and S3 are connected to their terminals a1, a2 and a3 respectively as shown at steps #1 and #3 of the flow chart. After that, an optical image of an object to be photographed which is incident upon the image sensor 2 is converted by the image sensor 2 into an electrical signal (a video signal). This signal is processed by the signal processing circuit 3. The circuit 3 then produces, for example, a luminance signal Y and a chrominance signal C. The luminance signal Y from the signal processing circuit 3 is mixed with a synchronizing signal SYNC produced from the CPU 1 by means of the mixer 4. The output of the mixer 4 is frequency modulated by the FM circuit 5. At the same time, the chrominance signal C is also supplied to the FM circuit 5 via the switch S2 and is likewise frequency modulated there. Then, the chrominance signal C is mixed with the luminance signal Y through the muting circuit 6 which is arranged to be turned off by a signal from the CPU 1. A mixed signal thus obtained is amplified by the recording amplifier 7 and is then recorded on the magnetic sheet 9 by means of the magnetic head 8. In this instance, for example, one field portion of the video signal thus obtained is recorded in one recording track.

In the case of reproducing the video signal, the change-over contacts of the switches S3, S8 and S9 are shifted to their terminals b3, b8 and b9 as shown at steps #9 and #11 in FIG. 4. A video signal which is reproduced from the magnetic head 8 is supplied via the reproduction amplifier 19 to the FM demodulation circuit 20. A demodulated signal thus obtained from the circuit 20 is converted into an NTSC signal by the signal processing circuit 22. The monitor 23 produces the output of the circuit 22 in the form of an image.

In recording sounds, the magnetic head 8 is shifted to a new track by the head shifting device 10. Then connecting positions of the switches S1, S3, S4 and S7 are shifted to their terminals b1, a3, a4 and a7 respectively as shown at steps #21 and #23 of FIG. 4. The sounds to be recorded are converted by the microphone 12 into an electrical signal. The signal is amplified by the pre-amplifier 13. The output of the pre-amplifier 13 is then supplied to the first and second time base changing elements 14 and 15 respectively via the switch S4 and the switch S5 which shifts its connecting position at every one-horizontal scanning period (hereinafter referred to as 1 H). Each of the time base changing elements 14 and 15 consists of, for example, a 1 H CCD delay line, etc. Recording is performed within the effective period of 1 H (one horizontal scanning period). Normally, with the audio signal sampled at a frequency of about 14 MHz, each of these elements 14 and 15 has a capacity of 1 H portion of the signal consisting of about 780 bits. Further, these time base changing elements 14 and 15 are arranged to be driven at a speed corresponding to driving pulses. Although it depends on the number of phases of the time base changing elements 14 and 15, in the case of this specific embodiment, driving pulses $\phi 1a$, $\phi 1b$, $\phi 2a$ and $\phi 2b$ are employed as the above-stated driving pulses.

Assuming that the connecting position of the switch S5 is on the side of the terminal b5 thereof at the beginning as shown at a step #25 in FIG. 4, the audio signal produced via the pre-amplifier 13 and the switch S4 is supplied to the first time base changing element 14 which is driven according to the driving pulse $\phi 1a$ as shown at a step #27. In this specific embodiment, the element to be driven by the driving pulses $\phi 1a$ and $\phi 2a$ is arranged to be interchanged between the elements 14 and 15. Therefore, in the flow chart of FIG. 4, the element to be driven is indicated as an element A. The driving pulse $\phi 1a$ is arranged to be 1/1000 of the sampling frequency of, for example, 14 MHz which is employed in setting the capacity of each of the time base changing elements 14 and 15 as mentioned above, that is, the driving pulse $\phi 1a$ is 14 KHz or thereabout. Therefore, assuming that the capacity of the time base changing element 14 is 780 bits, a length of about 55 msec of an audio signal is stored at the first time base changing element 14. Further at that moment, the connecting position of the switch S6 is on the side of its terminal a6. Upon completion of the storing or accumulating process at the first time base changing element 14 after the lapse of 55 msec, the flow of operation branches out from a step #29 to a step #31. If this process has not been completed at the step #29, the switches S5 and S6 are respectively caused to shift their connecting positions to terminals a5 and b6 by a change-over signal from the CPU 1. Then, the audio signal is likewise stored by the second time base changing element 15. In other words, at the step #37, the element A is changed from the first time base changing element 14 over to the second time base changing element 15. Sampling is caused to be performed by the driving pulse $\phi 2a$ which is of the same frequency (14 KHz) as the driving pulse $\phi 1a$ and the audio signal is stored at the second time base changing element 15. With the change-over thus effected at the step #37, during the storing or accumulating process at the second time base changing element 15, that is, when the flow of operation branches out from a step #29 to a step #33, the audio signal stored at the first time base changing element 14 is read out at a high speed with the driving pulse $\phi 1b$ which has a frequency (14 MHz) about 1000 times as high as the above-stated driving pulse $\phi 1a$ at a step #35. In this specific embodiment, the element from which the audio signal is thus read out at the high speed with the driving pulses $\phi 1b$ and $\phi 2b$ interchanges between the first and second time base changing elements 14 and 15 and, in the flow chart, this element is indicated as an element B. The audio signal which is read out from the first time base changing element 14 is supplied to the mixer 4 via the switches S6 and S7, the pre-amplifier 16 and the switch S1. Then, a synchronizing signal SYNC which is produced from the CPU 1 is added to the read-out audio signal. After this, the audio signal is supplied to the magnetic head 8 via the FM circuit 5 and the recording amplifier 7 to be recorded on the magnetic disc or sheet 9. In this instance, a 1-H portion of the audio signal is recorded only in a recording area T11 within the track T1 as shown in FIG. 2. During this process, the recording amplifier 7 never becomes operative with the head at any parts other than the recording area T11. More specifically, at the step #33 which is to be carried out immediately before a step #35, the CPU 1 detects the recording area T11, for example, through the rotating phase of the magnetic disc 9 and turns on the recording amplifier 7 only when recording timing comes to coincide with the recording area T11 at the step #36. Meanwhile, the audio signal is being accumulated at the second time base changing element 15. Upon completion of this accumulating process after the lapse of 55 msec from change-over of the connecting position of the switch S5 to the terminal a5, the position of the switch S5 is shifted to the other terminal b5. Then, the CPU 1 applies the driving pulse $\phi 1a$ which has a frequency of 14 KHz to the first time base changing element 14. The audio signal of a length of, for example, 55 msec or thereabout which is accumulated at the second time base changing element 15 is also read out at a high speed (14 MHz) in the same manner as in the case of the first time base changing element 14. The reading timing corresponds to a timing for recording in another area located next to the above-stated recording area T11 (see FIG. 2). For example, a period of 55 msec or thereabout elapses after completion of recording in the recording area T11 and before commencement of recording in the next area T12. During this period, the magnetic disc or sheet makes several turns (four turns in this case).

With the steps described above repeated one after another length of 14 seconds or thereabout (55 msec ×240 H) of the audio signal is band compressed and recorded in one track.

In the event of a recording audio signal extending over a long period (longer than 14 sec in this case), the signal can be recorded continuously in a plurality of adjoining tracks. In that event, the head shifting device 10 radially shifts the magnetic head 8 to change the position of the head from one track over to another. The audio signal then can be recorded without interruption by suitably delaying the output timing of the time base changing elements 14 and 15.

In reproducing an audio signal from magnetic disc 9, the connecting positions of the switches S3, S4, S7 and S8 change to their terminals b3, b4, b7 and a8 and the position of the magnetic head 8 shifts to a given track as shown at steps #51 and #53 in the flow chart of FIG. 4. Then, a reproduced audio signal is supplied to the first time base changing element 14 via the reproduction amplifier 19, the FM demodulator 20, the switch S8, the pre-amplifier 21 and two switches S4 and S5. The element 14 is then driven by the driving pulse $\phi 1b$ of the frequency of 14 MHz or thereabout to sample and accumulate the reproduced audio signal. Upon completion of this accumulating action, the connecting positions of the switches S5 and S6 shift to their terminals a5 and b6 respectively. Then, the second time base changing element 15 comes to accumulate a 1-H portion of the audio signal reproduced by the magnetic head 8. During the accumulating action of the second element 15, the 1-H portion of the audio signal stored at the first time base changing element 14 is produced at a low speed according to the driving pulse $\phi 1a$ of 14 KHz as a length of 55 msec of audio signal. The audio signal from the element 14 is amplified by the amplifier 18 and is supplied to the speaker 17 to be produced as sounds. While the 1-H portion of the audio signal is thus produced, the magnetic disc 9 makes 3 to 4 turns under the magnetic head 8. Meanwhile, a next 1-H portion of the audio signal is taken out and accumulated at the second time base changing element 15. When the 1-H portion of the audio signal has been completely produced from the first time base changing element 14, the positions of the switches S5 and S6 change to their terminals b5 and a6 respectively. As a result, the audio signal stored at the second time base changing element 15 is read out according the driving pulse $\phi 2b$ of 14 KHz. By this, the second 1-H portion of the audio signal can be continuously produced from the speaker 17 without showing any unnaturalness. Further, during this period, another 1-H portion of the compressed audio signal is accumulated at the first time base changing element 14. With these steps repeated, a 14 sec portion of the audio signal can be reproduced from the speaker 17. These actions which are as shown at steps #55 to #67 of FIG. 4 are performed in the same manner as in the steps #25 to #37 which are performed for recording. The difference between these two loops of steps is nothing more than that one is for recording and the other for reproduction. Therefore, the details of these steps #55 to #67 are omitted from the description given here.

In the audio signal reproduced by the embodiment described, a recurrent noise of, for example, a cycle of 55 msec might be added to result in a buzz sound of about 20 Hz. This buzz sound, however, can be easily lessened by arranging a pre-holding circuit to sample and hold the last value of each 1-H portion of the audio signal for smooth demodulation of the audio signal. While two time base changing elements 14 and 15 are employed in the embodiment, more than two time base changing elements may be used.

Further, while a single magnetic head 8 is used in the embodiment for recording or reproduction by switching the image and the sound from one over to the other, the video recording or reproduction and the audio recording or reproduction may be arranged to be accomplished with different magnetic heads and related circuits.

In the case of the embodiment described, the audio signal is recorded with the synchronizing signal added thereto. However, this invention is applicable also to a case where the audio signal is arranged to be recorded without adding any synchronizing signal. The invention is applicable also to cases where not only the images picked up by the image sensor and the audio signal coming via a microphone are recorded or reproduced but also where video and audio signals coming from external devices such as a picture receiver, a VTR, a video disc, etc. are arranged to be recorded or reproduced.

The embodiment which is arranged as described above is capable of recording or reproducing sounds by carrying out band compression or band expansion without recourse to any arrangement for A/D and D/A converting processes which have been necessary for the convertional recording and/or reproducing apparatuses. It is another advantage of this embodiment that the number of required parts can be reduced to a great degree for reduction in cost. Further, in the case of the foregoing description, the audio recording begins after stabilization of the rotation of the magnetic disc or sheet 9. However, the embodiment is arranged to be capable of immediately starting audio recording without waiting for stabilization of the rotation of the magnetic sheet 9.

Figure 3:
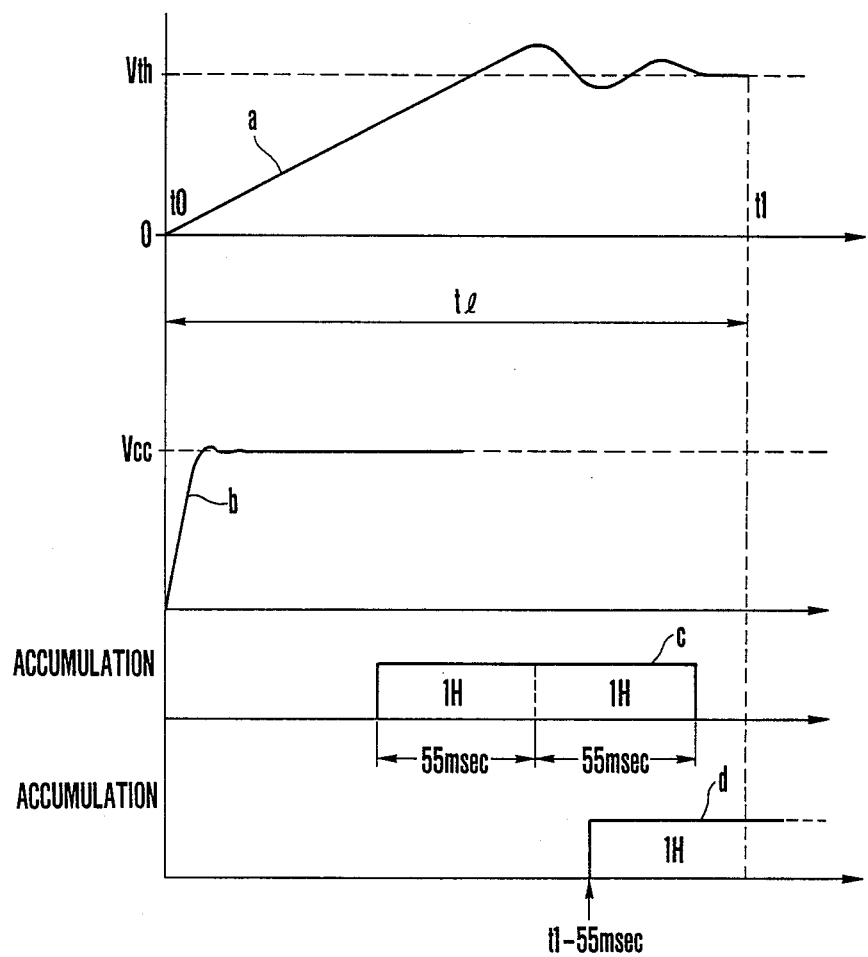
FIG. 3 is a timing chart showing the operation of the first embodiment.

For example, as indicated by a curve "a" in FIG. 3, a period tl of about several hundreds of msec is required before speed and phase control becomes possible with the rotation of the magnetic sheet 9 stabilized after the stand-by button 25 is turned on. Compared with this period of time tl, the rise time of circuit elements such as the amplifier 13, etc. is extremely short and is ignorable as indicated by a curve "b" in FIG. 3. Therefore, even if a recording instruction signal is produced before the lapse of the period of time tl after the stand-by switch 25 is closed, the CPU 1 produces the driving pulses $\phi 1a$ and $\phi 2a$ to drive the time base changing elements 14 and 15 one after another almost at the same time as the instruction signal, so that the audio signal coming from the microphone 12 can be immediately band compressed and accumulated. Assuming that each of the time base changing elements 14 and 15 has a capacity of 1 H portion of the signal and that the audio signal is compressed to about 1/1000, 55 msec ×1000 =55 msec of the audio signal is stored or accumulated at each of the time base changing elements 14 and 15 before the point of time tl at which the rotation of the magnetic sheet 9 becomes stable as indicated by a line "c" in FIG. 3. With the two time base changing elements 14 and 15 put together, a total length of 110 msec of the audio signal is recordable.

The audio signal accumulated at the time base changing elements 14 and 15 is recorded on the magnetic sheet 9 according to the driving pulses $\phi 1a$ and $\phi 2a$ after the lapse of the period of time ending at the point of time t1.

Figure 5:
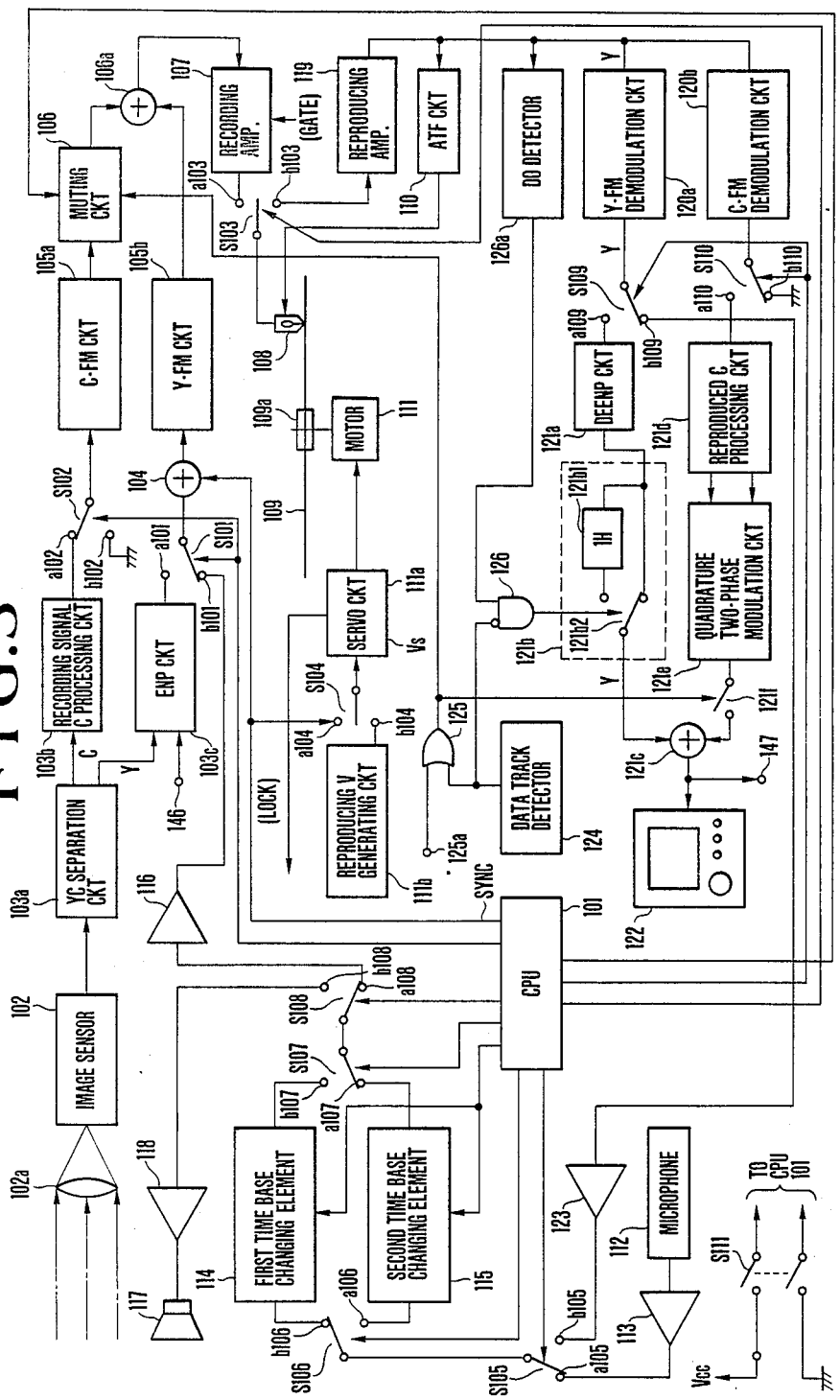
FIGS. 5 and 6 are block diagrams showing the arrangement of a second embodiment of this invention.

In case that a recording instruction is produced before the point of time t1 and that audio recording is to be continuously performed after the lapse of the period ending at the time point t1, the audio signal accumulating process is carried on according to the driving pulses $\phi 1a$ and $\phi 2a$ produced from the CPU 1 as indicated by a line "d" in FIG. 3. Again referring to the line "d" of FIG. 3, the timing of the driving pulses is such that, with one of the two time base changing elements beginning its accumulating action at a point of time t1 −55 msec and ending at the point of time t1, the accumulating action of the other element begins concurrently with the end of that of the first element. In this instance, the driving pulse $\phi 1a$ is produced at the point of time t1 −55 msec and another driving pulse $\phi 2a$ at the point of time t1. By virtue of this arrangement the about 55 msec portion of the audio signal which is supplied before stabilization of the rotation of the magnetic sheet 9 and another portion of the audio signal supplied after the stabilization can be continuously recorded. In accordance with the arrangement of this embodiment, therefore, sounds obtained before the recording operation on the recording medium can be recorded, so that necessary sounds can be prevented from being damaged. In the foregoing description of the first embodiment, the details of the data track which is disposed in the innermost part of the magnetic recording disc are omitted. The description of a second embodiment given below with reference to FIGS. 5 to 11, includes recording and reproducing operations on this data track:

Referring to FIG. 5, a CPU 101 is arranged to perform driving control over a still video recording and/or reproducing apparatus. An image sensor 102 which is a CCD or the like is arranged to pick up an optical image coming from an optical system 102a. A YC separation circuit 103a is arranged to divide a video signal coming from the image sensor 102 into a luminance signal Y and a chrominance signal C. A recording signal C processing circuit 103a is arranged to perform a predetermined signal processing operation on the chrominance signal C produced from the YC separation circuit 103a. An emphasis circuit 103c (hereinafter referred to as ENP circuit) is arranged to perform an emphasis process on the luminance signal Y produced from the YC separation circuit 103a. A mixer 104 is connected to the change-over contact of a switch S101. A C-FM circuit 105a is connected to the change-over contact of a switch S102 and is also connected via a muting circuit 106 to a mixer 106a. A Y-FM circuit 105b is connected to the change-over contact of the above-stated mixer 104 and is also connected to the mixer 106a. A recording amplifier 107 is connected to the output terminal of the mixer 106a and is arranged to be turned on and off by an incoming gate signal. A single magnetic head 108 is arranged to perform signal recording and reproducing operation on a magnetic sheet 109 which serves as a recording medium. The head 108 is connected to the change-over contact of a switch S103. An ATF circuit 110 is arranged to perform tracking control by radially shifting the magnetic head 108 on the magnetic sheet 109 in accordance with a signal produced from the CPU 101. A motor 111 is arranged to rotate the magnetic sheet 109. A servo circuit 111a is arranged to control the rotating speed and phase of the motor 111 on the basis of a vertical synchronizing signal obtained either from a reproduction vertical synchronizing signal generating circuit (hereinafter referred to as reproducing V generating circuit) 111b via a switch S104 or from the CPU 101. A microphone 112 is arranged to convert sounds into an electrical signal (or an audio signal) and is connected to one terminal a105 of a switch S105. The change-over contact of this switch S105 is interconnected with that of another switch S106. A first time base changing element 114 is connected to one terminal b106 of the switch S106. A second time base changing element 115 is connected to another terminal a106 of the switch S106. A switch S107 is connected to the two time base changing elements 114 and 115 and is arranged to form a switch-over means in conjunction with the above-stated switch S106. The switch S107 has one terminal b107 connected to the first time base changing element 114 and another terminal a107 to the second time base changing element 115. Further this switch S107 has the change-over contact thereof interconnected with that of another switch S108. An amplifier 116 is connected to one terminal a108 of the switch S108 and has its output terminal connected to the terminal b101 of the switch S101. A speaker 117 is connected to another terminal b108 of the switch S108 via the amplifier 118. A reproduction amplifier 119 has its input terminal connected to the terminal b103 of the switch S103. A Y-FM demodulation circuit 120a is arranged to FM demodulate a luminance signal Y produced from the reproduction amplifier 119. The output terminal of the circuit 120a is connected to the change-over contact of a switch S109. A C-FM demodulation circuit 120b is arranged to FM demodulate a chrominance signal C produced from the reproduction amplifier 119. The output terminal of the circuit 120b is connected to the change-over contact of a switch S110. A deemphasis circuit 121a (hereinafter referred to as DEENP circuit) is connected to the change-over contact a109 of the switch S109. A drop-out compensating circuit 121b consists of a 1-H display line 121b1 and a switch 121b2 and is arranged to supply its output to a mixer 121c. A reproduced chrominance signal processing circuit 121d (hereinafter referred to as reproduced C processing circuit) is connected to the change-over contact a110 of the switch S110. A quadrature two-phase modulation circuit 121e is disposed behind the reproduced C processing circuit 121d and is arranged to supply its output via a switch 121f to a mixer 121c. A monitor 122 is arranged to reproduce a video signal produced from the mixer 121c. A pre-amplifier 123 is connected to the change-over contact b109 of the switch S109. The output terminal of the pre-amplifier 123 is connected to the change-over contact b105 of the switch S105. A data track detector 124 is arranged to produce a high level signal when the magnetic head 108 is positioned either at a data track which will be described later on or at a track designated by a data track designation signal produced from the CPU 101. An OR circuit 125 is connected to the output terminal of the data track detector 124 and is arranged to have the muting circuit 106 and a switch 121f turn on and off according to the output thereof. An AND circuit 126 is connected to the data track detector 124 and a drop-out detector 126a (hereinafter referred to as DO detector) and is arranged to have a switch 121b2 shift the connecting position thereof from one position over to another in accordance with the output thereof. A stand-by button S111 is connected to a power supply Vcc. The connecting position of each of the switches S101 to S109 is arranged to change from one position over to another according to a signal coming from the CPU 101. The magnetic sheet 109 is arranged in the same manner as the magnetic sheet 9 shown in FIG. 2. The innermost track (the data track) T32 of the sheet 109 is thus arranged to have predetermined information recorded therein. For example, the information includes:

1) information on images recorded in other recording tracks, such as a recording place, time, environment, etc. and other image pick-up data;

2) information on control data required in reproducing the image recorded in each of the tracks, such as the sequence of images, time, etc. required for reproduction by a television receiver;

3) control data required in reproducing the image recorded in each of the tracks, such as a sequence, a number of copies, etc. for printing out by a printer;

4) control data for adjustment of luminance, the hue of color, etc. required for reproduction by a television receiver or a printing out operation by a printer;

5) data required in reproducing the above-stated compressed audio signal and the related video signal.

For example, in the case where a continuous audio signal is recorded in a plurality of tracks, data required for reproduction control; and data required for repeating, making a pause, etc. in reproducing an audio signal.

A plurality of such data tracks may be arranged instead of using a single data track.

Figure 6:
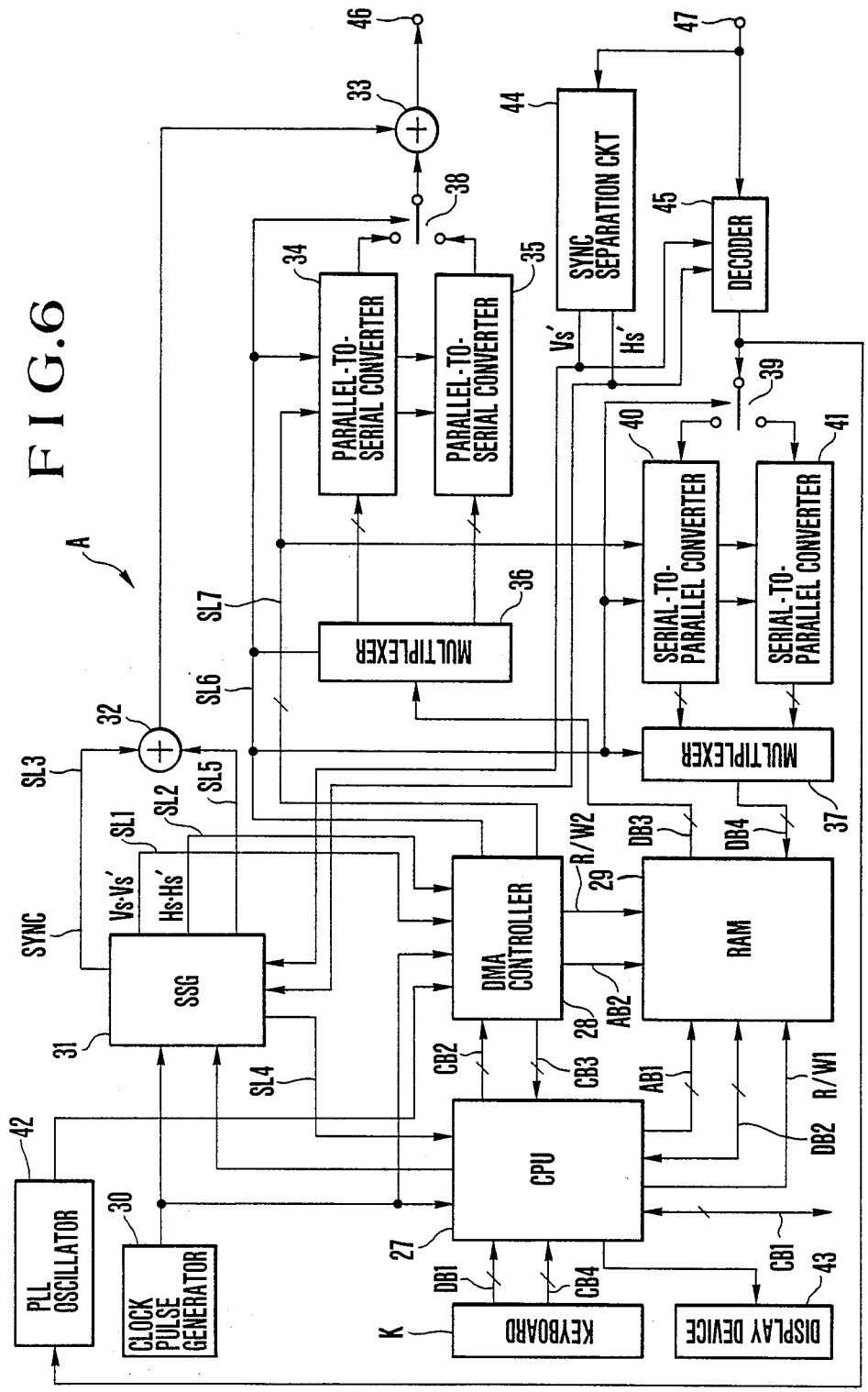

The details of an information signal generating circuit A which is information signal generating means for generating the above-stated information or data are arranged as shown in FIG. 6. Referring to FIG. 6, terminals 46 and 47 are connected to terminals 146 and 147 which are shown in FIG. 5. A keyboard K is arranged to serve as an input means. The information signal generating circuit A includes a CPU 27; a direct memory address (DAM) controller 28; a RAM 29 arranged to store data; a clock pulse generator 30; a synchronizing signal generator 31 (hereinafter referred to as SSG for short) which is arranged to produce a vertical synchronizing signal Vs, a horizontal synchronizing signal Hs, a composite synchronizing signal SYNC which consists of the synchronizing signals Vs and Hs and equalizing pulses, a pre-V signal which will be described later on and a white level signal for AGC and to supply these signals to signal lines SL1, SL2, SL3, SL4 and SL5 respectively; mixers 32 and 33; parallel-to-serial converters 34 and 35 which are arranged to convert parallel data into serial data; multiplexers 36 and 37; switches 38 and 39 which are arranged to change their connecting positions at every 1-H period; serial-to-parallel converters 40 and 41; a PLL oscillator 42; a display device 43; a sync separation circuit 44; a decoder 45; data buses DB1 to DB4; control buses CB1 to CB4; address buses AB1 and AB2; and reading/writing control lines R/W1 and R/W2 for the RAM 29.

In recording an image, operation means which is not shown is operated. In response to this, the CPU 101 which serves as driving control means produces a predetermined signal. The signal causes the change-over contacts of the switches S101, S102 and S103 to be connected to terminals a101, a102 and a103 of these switches respectively. An optical image which comes from an object via the optical system 102a to the image sensor 102 is converted by the image sensor 102 into an electrical signal (video signal). The video signal is supplied to the YC separation circuit 103a. The circuit 103a separates a luminance signal Y and a chrominance signal C from the video signal. The luminance signal Y comes to the mixer 106a via the emphasis (EMP) circuit 103b, the mixer 104 and the Y-FM circuit 105b. The chrominance signal C comes to the mixer 106a via the recording C processing circuit 103b, the switch S102, the C-FM circuit 105a and the muting circuit 106. The mixer 106a mixes these signals Y and C. The output of the muting circuit 106a is amplified by a recording amplifier 107. The amplified signal is applied via the switch S103 to the magnetic head 108. Through this head 108, one field portion of the signal is recorded in each of recording tracks T1 to T31 as applicable on the magnetic sheet 109 which is rotated by the motor 111. Meanwhile, although it is not shown in FIG. 5, a signal PG consisting of pulses each of which is generated by signal PG generating means per turn of the magnetic sheet 109 with the signal PG generating means attached to a part of the center core 109a of the sheet 109 is supplied to the servo circuit 111a along with a vertical synchronizing signal Vs which is produced by the reproducing V generating circuit 111b and is supplied via the switch S104. Then, according to these signals, the servo circuit 111a performs servo control over the motor 111 to have the magnetic sheet 109 constantly rotated at 3,6000 rpm and at a predetermined phase relative to the vertical synchronizing signal Vs.

In reproducing the recorded signal, the servo circuit 111a receives the above-stated signal PG and a vertical synchronizing signal V's equivalent to the vertical synchronizing signal Vs obtained from the reproduction vertical synchronizing oscillator (the reproducing V generating circuit) 111b via the switch S104. The servo circuit 11a then performs, on the basis of these signals received, servo control over the motor 111 to have the magnetic sheet 109 constantly rotated at 3,6000 rpm and at a predetermined phase relative to the vertical synchronizing signal V's. The recorded signal is then picked up by the magnetic head 108 and is amplified by the reproduction amplifier 119 which includes an AGC circuit. The output of the reproduction amplifier 119 is supplied to the ATF circuit 110 which is provided for tracking control over the head; to the DO detector 126a; to the FM demodulator 120a which demodulates the luminance signal Y including the synchronizing signal; and to the demodulator 120b which demodulates the chroninance signal C. The demodulated luminance signal Y which is obtained from the Y-FM demodulator 120a supplied to the mixer 121c via the deemphasis (DEENP) circuit 121a and the DO compensator 121b. The demodulated chrominance signal C is supplied also to the mixer 121c via the reproduced C processing circuit 121d, the quadrature two-phase modulation circuit 121e and the switch 121f. The mixer 121c mixes the luminance signal Y which includes the synchronizing signal with the chrominance signal C. A mixture signal thus obtained is supplied to the monitor 122. In the event of detection of a drop-out in the luminance signal Y during the process of reproduction, the output of the DO detector 126a causes the output of the AND circuit 126 to become, for example, a high level. As a result, at the DO compensation circuit 121b, the connecting position of the switch 121b2 shifts from the main line side thereof to the 1-H deley line 121b1. This causes the signal which is previously obtained preceding the present signal by a 1-H period to be supplied to the mixer 121c in place of the present signal, so that the drop-out of the luminance signal Y can be compensated for.

While the embodiment records and reproduces a color video signal in the manner as described above, it is not necessary to record and reproduce the chrominance signal C in the event of a black-and-white video signal. In that event, therefore, a black-and-white selection signal is supplied via a control terminal 125a. This signal renders the muting circuit 106 of the recording system operative via the OR circuit 125. The circuit 106 then operates to inhibit recording of the chrominance signal C. Meanwhile, the switch 121f of the reproduction system opens to cut off the supply of the chrominance signal C to the mixer 121c. This renders impossible any recording or reproducing operation on the chrominance signal C including a subcarrier wave. In this case, the audio signal is recorded and reproduced in the same manner as in the case of the first embodiment described in the foregoing.

Figure 7:
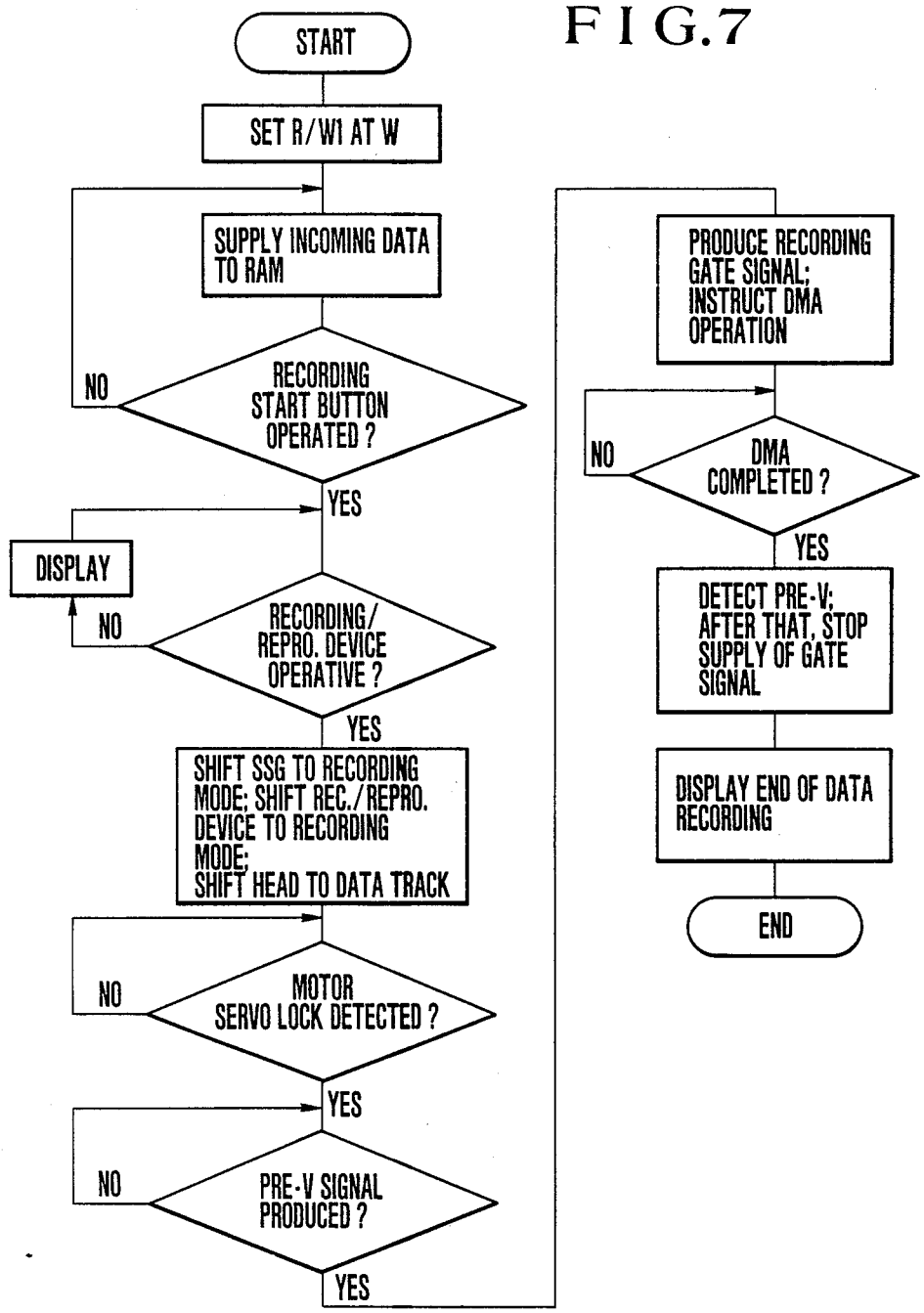
FIGS. 7 and 8 are flow charts showing the operation of a CPU 27 which is shown in FIG. 6.
Figure 8:
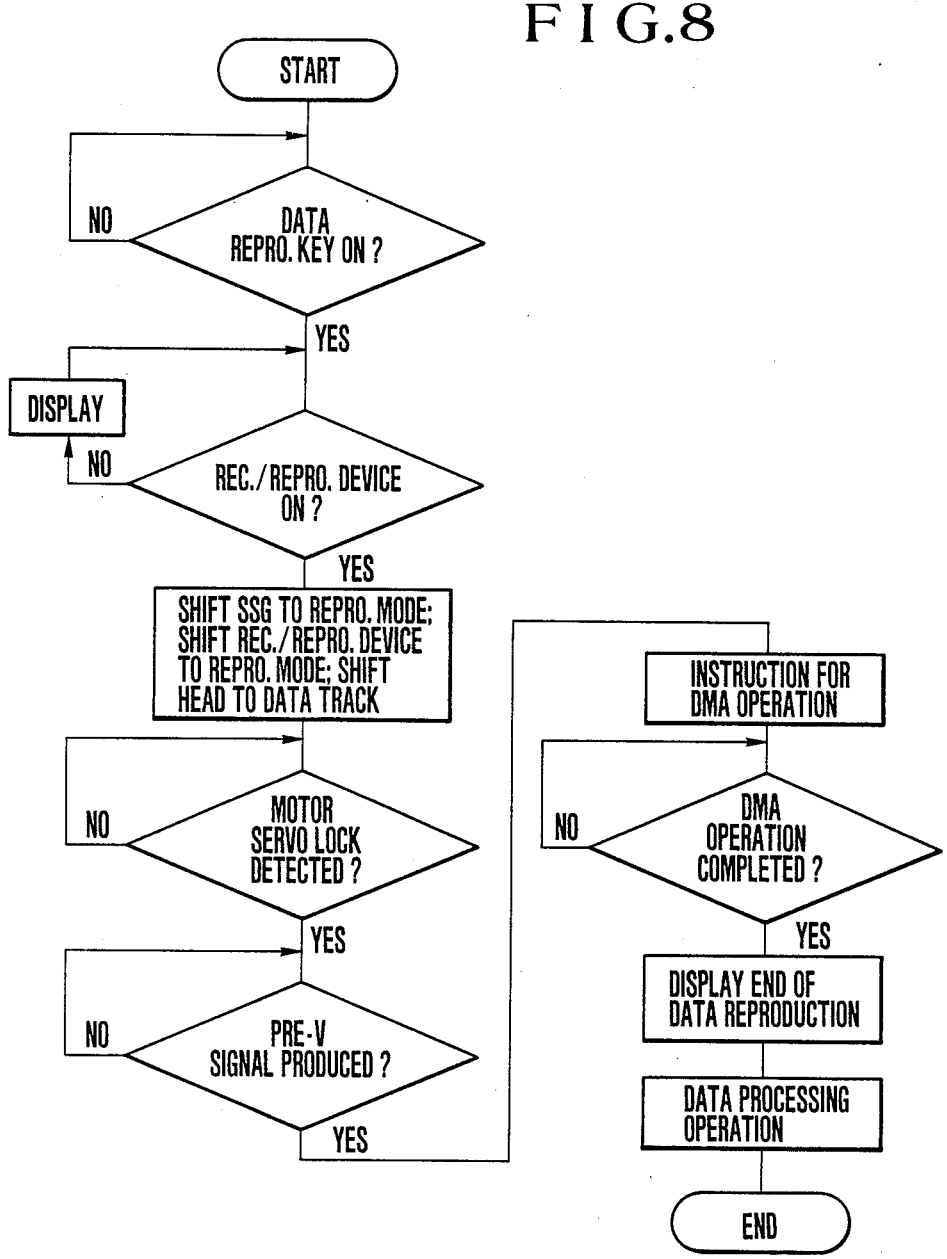

The circuit which is arranged as shown in FIG. 6 operates as described in the following with reference to FIG. 7 which is a flow chart:

Referring to FIG. 7, when the keyboard K is operated, the CPU 27 sets the writing/reading control line R/W1 in a writing position W in response to a control signal which comes via the control bus CB4. Following this, information coming from the keyboard K via the data bus DB1 is transmitted via the data bus DB2 to be written in the RAM 29 one after another. This operation is well known and, therefore, the details of which is omitted here. After completion of the data input process, when the recording start button is operated at the keyboard K, the CPU 27 makes a check in response to a recording start signal from the control bus CB4 to see if the power supply to the recording and reproduction system circuits shown in FIG. 5 has been switched on. If the power supply is found off, the CPU 27 causes the display device 43 to make a display to indicate this. If the power supply is found to have been switched on, the CPU 27 supplies a recording mode signal via the control bus CB1 to the recording/reproducing device. In response to the mode signal, the head is shifted to its data track position and the sheet rotating motor is started. Meanwhile, other recording circuits are rendered operative. Further, the SSG 31 is shifted into a recording mode. The clock pulse generator 30 of the SSG 31 then produces a clock signal. In accordance with the clock signal, there are produced the above-stated composite synchronizing signal, vertical and horizontal synchronizing signals Vs and Hs, a pre-V signal which represents a vertical synchronizing signal obtained 7 H periods before and a white level signal. Then, the CPU 27 waits for arrival of a signal indicative of a servo lock state of the sheet rotating motor 111 coming through the control bus CB1. During this period, the composite synchronizing signal and the white level signal are supplied from the SSG 31 916 to the recording and reproducing system circuits side via the mixers 32 and 33. On the side of the recording and reproducing system circuits, the vertical synchronizing signal is separated from the incoming signal and servo control is performed on the sheet rotating motor 111 on the basis of the vertical synchronizing signal. Then, when a signal indicative of a servo lock state is supplied via the control bus CB1 to the CPU 27, the CPU 27 detects the pre-V signal coming from the SSG 31 and produces via the control bus CB1 a gate signal for turning on a recording gate included in the recording amplifier 107 of the recording system of the recording and reproduction system circuit. At the same time, the CPU 27 produces an operating instruction via the control bus CB2 to a DMA controller 28. Upon receipt of the operating instruction, the DMA controller 28 sets the reading/writing control line R/W2 into a reading position R. The controller 28 then supplies the multiplexer 36 with data which includes 80 bits per 1-H period in accordance with the vertical and horizontal synchronizing signals Vs and Hs coming from the SSG 31. Further, it performs switch-over via a signal line SL6 alernately between the output of the multiplexer 36 and that of the switch 38 and performs change-over between reading and writing operations alternately on the parallel-to-serial converters 34 and 35. Further, shifting pulses are arranged to be applied from the controller 28 to the parallel-to-serial converters 34 and 35 via the signal line SL7. Therefore, while the data is written into the converter 34, the data is read out from the other converter 35. Conversely, while the data is read out from the converter 34, the data is written into the converter 35. When completion of the DMA operation of the DMA controller 28 is detected by the CPU 27 via the control bus CB3, the CPU 27 cuts off the supply of the gate signal to the recording amplifier of the recording and reproducing system over a period of 1 V (one vertical period) upon detection of a next pre-V signal. The CPU 27 then causes the display device 43 to make a display indicating the end of information recording.

Figure 9:
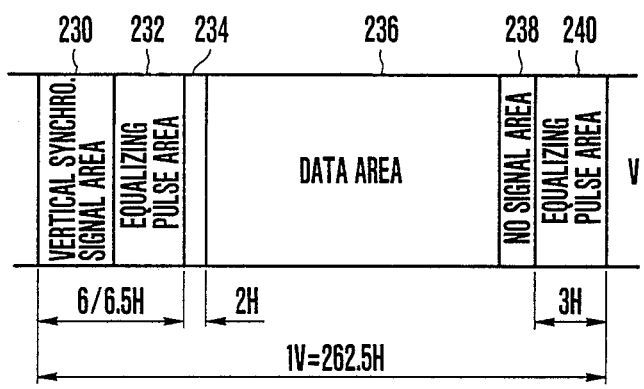
FIGS. 9 and 10 are illustrations showing by way of example a data signal generated by the apparatus shown in FIG. 6.
Figure 10:
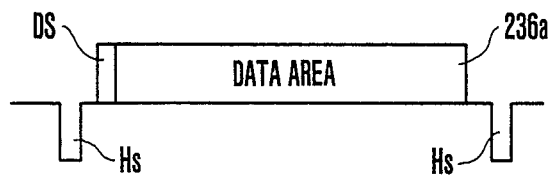

FIGS. 9 and 10 show bit arrangement of a composite information or data signal to be recorded in the data track of the magnetic sheet 109. The bit arrangement of the signal within the period of 1 V is as shown in FIG. 9. The bit arrangement within the period of 1 H is as shown in FIG. 10. Referring to FIG. 9, each 1-V period includes a vertical synchronizing signal area 230, an equalizing pulse area 232, a white level area 234 for a 2-H portion and a data area 236. The data area 236 is followed by a no signal area 238. An equalizing pulse area 240 comes last. As mentioned in the foregoing, the white level signal of the white level area is provided for AGC (automatic gain control). Referring now to FIG. 10, a known data synchronizing signal Ds is recorded after the horizontal synchronizing signal Hs. The signal Ds is followed by a data area 236a, in which 80 bits of data is recorded. The data synchronizing signal Ds is arranged to be added at the RAM 29.

The composite data signal which is recorded on the sheet 109 in the above-stated manner is processed and stored during reproduction in the following manner: Refering to FIG. 8, when a data reproduction key is pushed, a check is made for the power supply state of the recording and reproducing system circuit. The system circuit is shifted to a reproducing mode. The motor 111 becomes operative. The head 108 is shifted to the data track T32. The SSG 31 is shifted into a reproducing mode. Then, the sync separation circuit 44 produces reproduction synchronizing signals V's and H's which reset the SSG 31. The SSG 31 becomes operative according to the clock pulses produced from the oscillator 42. Accordingly, from the SSG 31 is obtained a synchronizing signal which is completely phase locked with a reproduced signal. A servo lock signal is obtained from the servo circuit 111a. After that, an instruction for the DMA operation is produced and supplied to the DMA controller 28 upon receipt of a first pre-V signal.

The DMA controller 28, sets the signal line R/W2 in its position W and makes the RAM 29 into a writing mode. Then, in synchronism with the synchronizing signals V's and H's from the SSG 31, data writing begins. The DMA controller 28 operates according to the synchronizing signals from the SSG 31 and the clock pulses produced from the PLL oscillator 42 in the same manner as in the case of data recording. The DMA controller 28 thus produces change-over pulses for change-over between the writing and reading modes of the multiplexer 36, the switch 39, and the serial-to-parallel converters 40 and 41 together with shift pulses for the converters 40 and 41.

The reproduced composite data signal which is supplied to the input terminal 47 has the composite synchronizing signal removed therefrom at the decoder 45. After that, the signal is supplied alternately to the serial-to-parallel converters 40 and 41 in a manner alternating between them at every 1-H period. As a result, parallel data is produced from the converters 40 and 41 also in a manner alternating at every 1-H period and is written into the RAM 29. Upon completion of the DMA operation, the end of it is detected by the CPU 27 and is displayed at the display device 43. Following this, the CPU 27 performs a data processing operation including error correction, etc. and then the operation comes to an end.

Next, recording and reproducing operations on the data signal are as follows:

In recording, a data signal (hereinafter referred to as the composite data signal) which includes the synchronizing signals Vs and Hs and the equalizing pulse and is produced from the data signal output terminal 146 of FIG. 5 is supplied also to the YC separation circuit 103a in the same manner as in the case of a video signal. Then, when the head 108 is positioned either at the predetermined data track T32 on the magnetic sheet 109 or at a track designated by the data track designation signal produced from the CPU 101 of FIG. 5, the output level of the data track detector 124 becomes high. The high level output of the detector 124 renders the muting circuit 106 operative to inhibit recording of the chrominance signal C including the subcarrier wave in the same manner as in the case of recording the black-and-white video signal. Under this condition, the above-stated composite data signal which comes from the terminal 146 to the ENP circuit 103c is recorded by the head 108 in the data track T32 on the sheet 109 in the same manner as in the case of the luminance signal Y including the synchronizing signal. More specifically, the composite data signal is recorded after undergoing the emphasis and FM processes. In this instance, before the composite data signal is thus produced, the SSG 31 of FIG. 6 applies the vertical synchronizing signal Vs via the sync separation circuit 44 and the switch S104 to the servo circuit 111a in the manner as described in the foregoing. Therefore, the servo circuit 111a is controlling the motor 111 to have the magnetic sheet 109 constantly rotated at a speed of 3,600 rpm and in a predetermined phase relation to the vertical synchronizing signal Vs on the basis of the signals Vs and PG. Further, in recording the data signal, the CPU 101 of FIG. 5 performs control as follows: During the recording period of 1 V (one vertical period), the recording gate within the recording amplifier 107 is turned on, for example, and, in synchronism with this, the above-stated composite data signal is applied to the input terminal b103, so that the data signal can be recorded in one track on the sheet 109.

Figure 11:
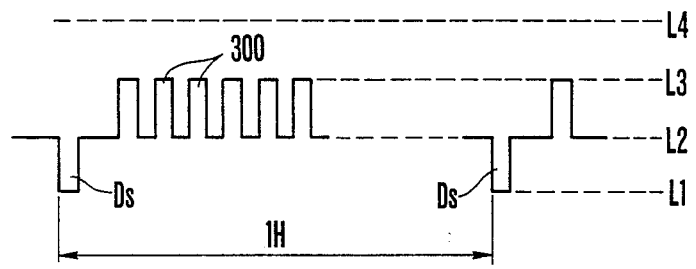
FIG. 11 shows by way of example frequency modulating performed by the second embodiment.

In reproducing the recorded composite data signal, the connecting position of the switch S104 is shifted to the side of the reproduction vertical synchronizing oscillator 111b in the same manner as in the case of reproducing the video signal. Then, the servo circuit 111a performs servo control over the motor 111 to have the sheet 109 constantly rotated at 3,600 rpm in a predetermined phase relation to the synchronizing signal V's on the basis of the signals V's and PG. Then, the head 108 picks up the composite data signal. The signal is amplified by the reproduction amplifier 119 which includes the AGC circuit. The amplified signal is applied to the ATF circuit 110, the DO detector 126a, the Y-FM demodulator 120a and the C-FM demodulator 120b respectively. The ATF circuit 110 operates in the same manner as in the case of reproducing the video signal to perform the tracking control over the magnetic head 108. The output of the DO detector 126a is cut off by the AND circuit 126 as the output of the data track detector 124 is at a high level. Therefore, the DO compensation circuit 121b becomes inoperative. The switch 121b2 of the circuit 121b remains connected to the main line. Further, in this instance, the high level output of the OR circuit 125 comes to open the switch 121f which is connected to the output terminal of the quadrature two-phase modulation circuit 121e. Therefore, the output of the circuit 121e is inhibited from coming to the mixer 121c in the same manner as in the case of the black-and-white video signal. This prevents the mixer 121c from receiving even the subcarrier wave for the chrominance signal C. Under this condition, the composite information or data signal which is demodulated by the Y-FM demodulator 120a is supplied to the signal generating circuit A of FIG. 6 via the deemphasis circuit 121a, the switch 121f of the DO compensation circuit 121b and the mixer 121c. This arrangement effectively saves the reproduced information signal from being disturbed by the DO compensation or the inclusion of a subcarrier wave for the chrominance signal C. An example of FM modulation arrangement for the above-stated composite information signal is as described below with reference to FIG. 11:

In FIG. 11, a reference numeral 300 denotes a high level information signal. The sink tip level L1 of the horizontal synchronizing signal Hs is set, for example, at 6 MHz, the pedestal level L2 at 6.5 MHz, the high level L3 of the information signal 300 (equivalent to 50% white level) at 7 MHz and the white peak level L4 of the video signal at 7.5 MHz. The high level of the information signal 300 is preferably set at an intermediate point between the pedestal level L2 and the white peak level L4, because if the high level L3 is set about the same level as the white peak level L4, the high level would be emphasized by the emphasis circuit 103a included in the recording system shown in FIG. 5. Then, this would trigger some adverse phenomenon such as inversion, or the like that makes accurate data recording impossible. To avoid this trouble, the high level L3 of the information signal 300 is set at an intermediate level which is, for example, equivalent to the white level. This level setting arrangement not only permits data recording with the emphasis circuit left serviceable but also makes the high level readily distinguishable from the pedestal level (the low level of the information or data signal 300).

In the embodiment described, the synchronizing signal for the image is added to the data signal as described in the foregoing. This arrangement enables the main parts of the video signal recording and reproducing system to be utilized also for recording and reproducing the data signal. The muting circuit for the chrominance signal which is provided for recording a black-andwhite video signal can be also arranged to be usable for recording the information (or data) signal. That arrangement advantageously cut the subcarrier wave for the chrominance signal which has an adverse effect on data recording. Further, the arrangement to have the output of the quadrature two-phase modulation circuit for the chrominance signal inhibited from being supplied to the mixer during the reproducing operation on the information signal in the same manner as in the case of reproduction of a black-and-white video signal likewise effectively prevents the adverse effect of the subcarrier wave on the chrominance signal. The embodiment is thus arranged to be capable of accurately recording and reproducing the information (or data) signal.

In the embodiment described, two time base changing elements 14 and 15 are employed. However, the number of these elements may be increased.

The use of a single magnetic head 108 for recording and reproduction both images and sounds with switchover arrangement may be changed to use separate magnetic heads and circuits for recording and reproduction of images and sounds.

The arrangement of the embodiment described is applicable not only to an apparatus for recording and reproduction of images picked up by an image sensor and sounds received from a microphone but also to such apparatuses that record and reproduce images and sounds produced from external devices such as a television receiver, a VTR, a video disc, etc. An advantageous feature of this embodiment resides in that sounds can be recorded and reproduced with band compression and band expansion without A/D and D/A conversion which has been indispensable with the conventional apparatus. It is another advantage of the embodiment that the arrangement thereof permits a reduction in the number of necessary parts to a great extent. It is a further advantage of the embodiment that the recorded sounds and images can be adequately and correctly reproduced on the basis of the recorded information or data obtained by reproduction.

Figure 13:
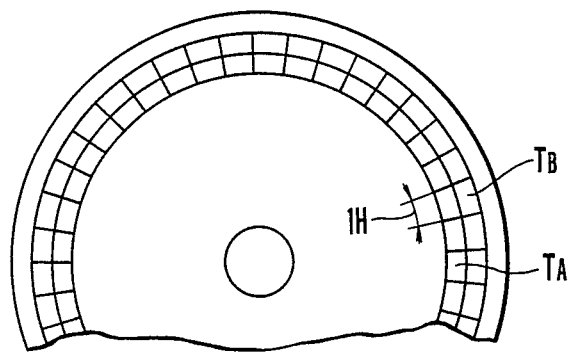
FIG. 13 shows by way of example a recording pattern of the apparatus shown in FIG. 12.
Figure 12:
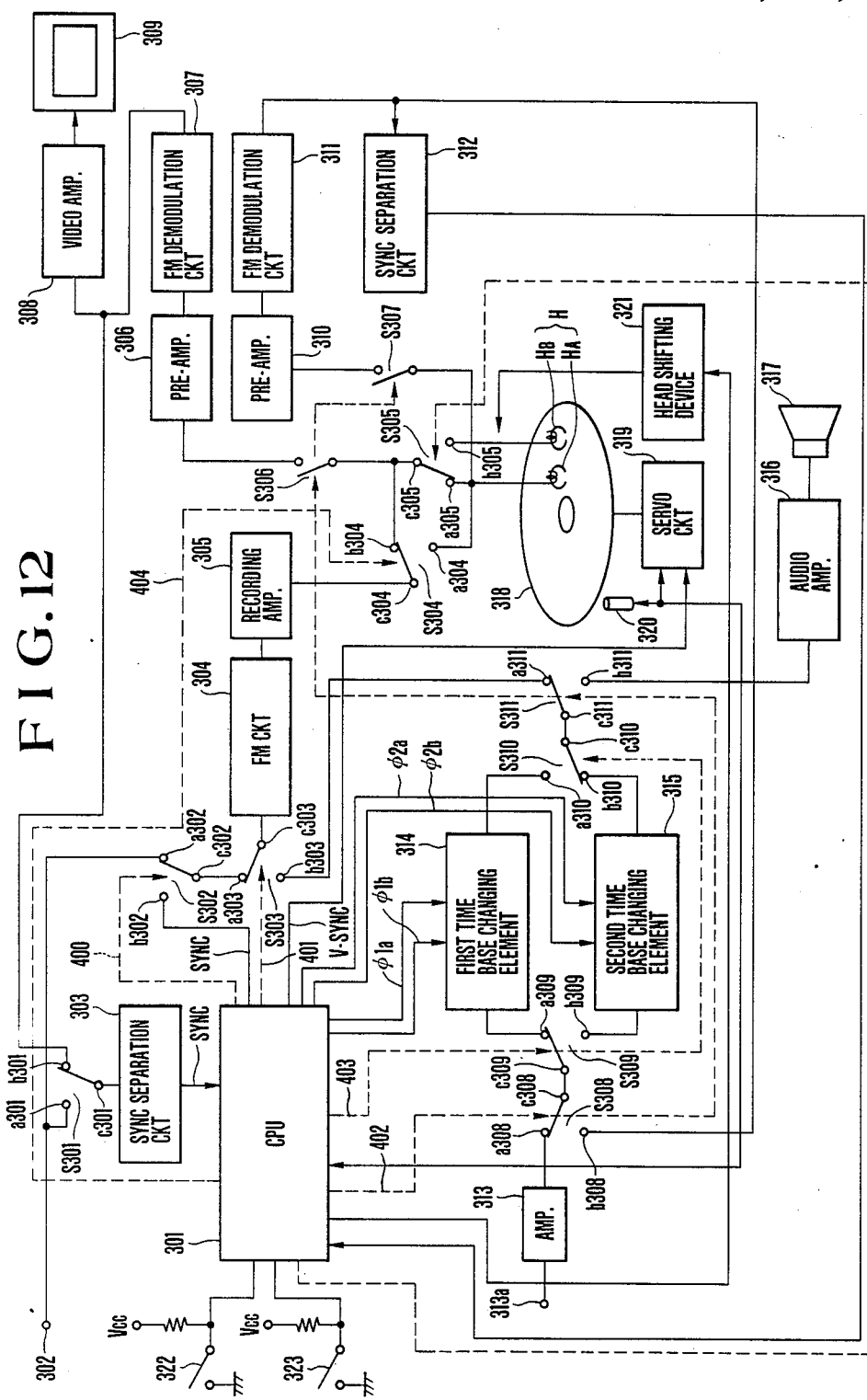
FIG. 12 is a block diagram showing the arrangement of a third embodiment of this invention.

In a third embodiment given below with reference to FIGS. 12 and 13, audio and video signals are recorded and reproduced with a plurality of magnetic heads:

FIG. 12 shows in a block diagram a still video recording and/or reproducing apparatus embodying this invention as the third embodiment thereof. The third embodiment features the use of an in-line head including two heads HA and HB. A CPU 301 is arranged as driving control means for controlling various circuit elements and switches. An input terminal 302 is arranged to receive a composite video signal including synchronizing signals such as an NTSC system signal or the like. A sync separation circuit 303 which serves as synchronizing signal separating means is connected to the input terminal 302 via a switch S301. The output of the circuit 303 is supplied to the CPU 301. An FM circuit 304 is connected to the input terminal 302 via switches S302 and S303. A recording amplifier 305 is connected to this FM circuit 304. The output terminal of the amplifier 305 is connected via a switch S304 to the head HA which is included in the in-line head H. A switch S305 is connected to the above-stated switch S304. The switch S305 is provided with terminals a305, b305 and c305. The terminal c305 is connected to a terminal b304 of the switch S304, the terminal a305 to another terminal a304 of the switch S304 and the terminal b305 to the other head HB of the in-line head H. A pre-amplifier 306 is connected to the terminal c305 of the switch S305 via a switch S306. An FM demodulation circuit 307 is connected to the pre-amplifier 306. The output of the circuit 307 is arranged to be supplied to a monitor 309 via an image amplifier 308 and also to one terminal b301 of the switch S301. A pre-amplifier 310 is connected via a switch S307 to the terminal a305 of the switch S305. An FM demodulation circuit 311 is connected to the pre-amplifier 310. The output terminal of the FM demodulation circuit 311 is connected to one terminal b308 of a switch S308 and to a sync separation circuit 312. An audio signal input terminal 313a is arranged to receive an audio signal and is connected via an amplifier 313 to another terminal a308 of the switch S308. A first time base changing element 314 is connected to a terminal c308 of the switch S308 via a switch S309. A second time base changing element 315 is connected also to the terminal c308 via the switch S309. The first and second time base changing elements 314 and 315 jointly form time base changing means which is composed of a CCD 1-H delay line. A switch S310 is disposed behind these elements 314 and 315. One terminal a310 of the switch S310 is connected to the first time base changing element 314 and the other terminal b310 to the second time base changing element 315. A switch S311 is disposed subsequent to the switch S310. One terminal c311 of the switch S311 is connected to the terminal c310 and another terminal a311 to the terminal b303 of the switch S303. An audio amplifier 316 is connected to the terminal b311 of the switch S311. The output of the amplifier 316 is arranged to be supplied to a speaker 317. A servo circuit 318 is arranged to control the rotating speed and phase of a magnetic sheet 318. The control operation is performed on the basis of a vertical synchronizing signal V-SYNC coming from the CPU 301 and a signal produced by a known PG pulse detecting device 320. A head shifting device 321 is arranged to shift the position of the in-line head H to a given recording track in accordance with a signal from the CPU 301. A reference numeral 322 denotes a recording switch and another numeral 323 a reproduction switch. The connecting positions of the above-stated switches S301 and S311 are arranged to change from one position over to another in response to a change-over signal coming from the CPU 301.

The third embodiment which is arranged as described above operates as follows:

In recording, the terminals a301 and c301 of the switch S301 are interconnected. A composite video signal coming via the video input terminal 302 is supplied to the separation circuit 303. A synchronizing signal SYNC is taken out from the video signal and is supplied to the CPU 301. Upon receipt of the signal SYNC, the CPU 301 produces a change-over signal 400 to shift the connecting position of the switch S302 to connection between the terminals b302 and c302. To the terminal c302 is supplied the composite video signal. In case that the composite video signal is not coming to the video input terminal 302, the CPU 301 shifts the position of the switch S302 to connection between the terminals b302 and c302 by means of the change-over signal 400. The terminal b302 is receiving the synchronizing signal SYNC from the CPU 301. Therefore, the signal SYNC is supplied to the terminal b302 of the switch S302 even in the absence of the video signal.

In case that no composite video signal is received, that is, when an audio signal is alone received, the embodiment performs recording in the following manner:

Under this condition, change-over signals 401 and 402 are provided to shift the connecting positions of the switches S302, S303, S308 and S311 to connections between the terminals b302 and c302, between the terminals b303 and c303, between the terminals a308 and c308 and between the terminals a311 and c311. Further, the switches S306 and S307 are turned off. Then, the synchronizing signal SYNC produced from the CPU 301 is thus supplied to the FM circuit 304 via the switches S302 and S303. The signal SYNC from the circuit 304 is amplified by the recording amplifier 305 and is supplied via the switches S304 and S305 to the head HB of the in-line head H. The head HB then records the synchronizing signal SYNC in one of the tracks of the magnetic sheet 318. The switches S304 and S305 at that time are in connecting positions between the terminals c304 and b304 and between c305 and b305 respectively. Meanwhile, the rotating speed and phase of the magnetic sheet 318 are under the control of the servo circuit 319. More specifically, for example, the control is performed in such a manner that the rotating speed is at 3600 rpm and the phase which is represented by the PG pulse detected by the known PG pulse detecting device 320 comes to be in a given phaee relation to a vertical synchronizing signal V-SYNC supplied to the terminal b302 of the switch S302. (for example, the control is performed to have the PG point obtained a 7-H period before the vertical synchronizing signal V-SYNC).

After completion of synchronizing signal recording, the terminals c304 and a304 of the switch S304 are interconnected. The audio signal which is immediately band compressed by the time base changing elements 314 and 315 is frequency modulated and is recorded on the magnetic sheet 318 by the head HA. The audio signal recording operation is identical with the operation of the preceding embodiment shown in FIG. 1 and, therefore, the details of it is omitted here.

When both the composite video signal and the audio signal are received, the embodiment operates as follows: As mentioned in the foregoing, in this instance, the synchronizing signal SYNC which is taken out from the composite video signal by the separation circuit 303 is supplied to the CPU 301. The CPU 301 then controls the operation of the time base changing elements 314 and 315 in accordance with this synchronizing signal. Then, the connecting positions of the switches S301, S302, S303, S304, S305, S308 and S311 are respectively between the terminals a301 and c301, between terminals a302 and c302, between terminals a303 and c303, between terminals c304 and b304, between terminals c305 and b305, between terminals b308 and c308 and between terminals c311 and b311. The composite video signal is supplied to the head HB of the in-line head H via the switches S302 and S303, the FM circuit 304, the recording amplifier 305 and switches S304 and S305. The head HB records the composite video signal on the magnetic sheet 318. After that, the position of the switch S304 shifts to connection between the terminals c304 and a304. This allows the band compressed audio signal to be recorded in a track located next to the track of the video signal. In the case of a field recording arrangement, the video signal recording comes to an end in 1/60 sec. Assuming that the audio signal is band compressed to an extent of 1/1000, audio signal recording in one track lasts about 16 sec (63 msec ×262.5 H). Therefore, if there is a several-field portion of the video signal before the audio signal recording, the driving pulses φ1a, φ1b, φ2a and φ2b and the change-over signals can be produced in synchronism with the video signal without performing video signal recording during the period of the audio signal recording. Therefore, the audio signal recording can be carried out without disturbing the synchronism.

Further, the audio signal recording can be brought to a stop by means of a switch which is not shown.

In the event of no audio recording, an audio signal muting switch which is not shown shifts the position of the switch S303 to connection between the terminals a303 and c303. A change-over signal 404 from the CPU 301 changes the connecting position of the switch S304 from one position to another for every field. The heads HA and HB operate to record one frame portion of a video signal in two adjacent tracks.

As described above, in performing audio recording, the video signal or the synchronizing signal is recorded by the head HB which is one of the two heads of the in-line head H while the audio signal is recorded by the other head HA. If audio recording is not required, one frame portion of the video signal is recorded in two tracks by using both the two heads HA and HB. Reproduction is performed as follows:

In case that the signal to be reproduced by the head HA and the signal to be reproduced by the head HB are both video signals, that is, when a frame recorded video signal is to be reproduced, the embodiment operates as follows: In this case, the switch S306 turns on. The video signal reproduced by the head HB is supplied to the video signal amplifier 308 and the sync separation circuit 303 via the switch S305, th pre-amplifier 306 and the FM demodulation circuit 307. An image is reproduced by the monitor 309. Meanwhile, the synchronizing signal which is taken out by the separation circuit 303 is supplied to the CPU 301. At the same time, the video signal which is reproduced by the head HA is supplied to the terminal b308 of the switch S308 and also to the sync separation circuit 312. The sync separation circuit 312 takes out the synchronizing signal from the video signal and supplies it to the CPU 301. The CPU 301 is arranged to make a discrimination from the presence or absence of the synchronizing signal to find whether the signal reproduced by the head HA is a video signal or an audio signal. When the synchronizing signal is received as mentioned above, the CPU 301 immediately begins a control operation for frame reproduction. In other words, in the event of frame reproduction, the CPU 301 performs control in accordance with the PG pulse detected by the PG pulse detecting device 320 to alternately change the connecting position of the switch S305 from one position over to another for every 1-V period. Meanwhile, the monitor 309 reproduces the frame video signal obtained from the heads HA and HB as an image.

In case that the signal reproduced by the head HA is an audio signal and the signal reproduced by the other head HB is a video signal, that is, if no synchronizing signal is produced from the sync separation circuit 303 in reproducing the signal from the head HA, the embodiment operates as follows: In that instance, when the switches S306 and S307 turn on, the connecting positions of the switches S305, S308 and S311 become between the terminals b305 and c305, between terminals b308 and c308 and between c311 and b311. The video signal which is taken out by the head HB is supplied to the monitor 309 and the sync separation circuit 303. The monitor 309 reproduces a field image. Meanwhile, a synchronizing signal taken out from the video signal is supplied from the sync separation circuit 312 to the CPU 301.

At the same time, the audio signal reproduced by the head HA is supplied to the sync separation circuit 312 and is also to the switch S308. Further, in that instance, no synchronizing signal is produced from the sync separation circuit 303 as mentioned above. The audio signal supplied to the switch S308 is reproduced in the same manner as in the case of the preceding embodiment described with reference to FIG. 1. More specifically, in the third embodiment as shown in FIG. 13, all the control operations including the interchanging operation over the driving pulses $\phi 1a$, $\phi 1b$, $\phi 2a$ and $\phi 2b$ which are used for driving the above-stated time base changing elements 314 and 315 are accomplished in synchronism with a signal obtained from the sync separation circuit 303 if both the signals obtained from the audio and video tracks TA and TB shown in FIG. 13 are at high levels.

Further, if the signal reproduced by the head HA is an audio signal and the signal reproduced by the other head HB is a synchronizing signal, the driving pulses $\phi 1a$, $\phi 1b$, $\phi 2a$ and $\phi 2b$ are controlled in synchronism with the synchronizing signal picked up by the head HB. By this, the compressed audio signal picked up by the head HA can be expanded. The expanded audio signal is produced as sounds from the speaker 317.

In the third embodiment, as described in the foregoing, field video recording is performed by the head HB which is one of the two heads of the in-line head H. Meanwhile, an audio signal relative to the video signal can be recorded by means of the other head HA. In reproducing the recorded signals, the audio signal can be reproduced while the field recorded video signal is reproduced. In addition to that, the embodiment is capable of recording and reproducing a frame video signal with both the heads HA and HB of the in-line head H. Further, the arrangement to have the synchronizing signal recorded in a track adjacent to the audio signal recording track in the case of recording only the audio signal enables a reproducing operation accurately and adequately carried out by using the recorded synchronizing signal. Further, the embodiment is capable of automatically detecting from a reproduced signal whether the signal recorded on the magnetic sheet 318 is a video signal or an audio signal. Therefore, reproducing operations can be adequately accomplished even in cases where a field video signal, an audio signal, a frame signal, etc. are recorded on the recording medium in a commingled manner.

In the third embodiment, the in-line head H is employed. However, the in-line head H may be replaced with two discrete heads. In that event, the audio signal track does not have to be arranged adjacent to the video signal recording track. As mentioned above, in addition to the advantages of the first embodiment, the third embodiment has another advantage that recording and reproduction can be adequately accomplished by utilizing the synchronizing signal included in the composite video signal without recourse to any special additional means.

Figure 14:
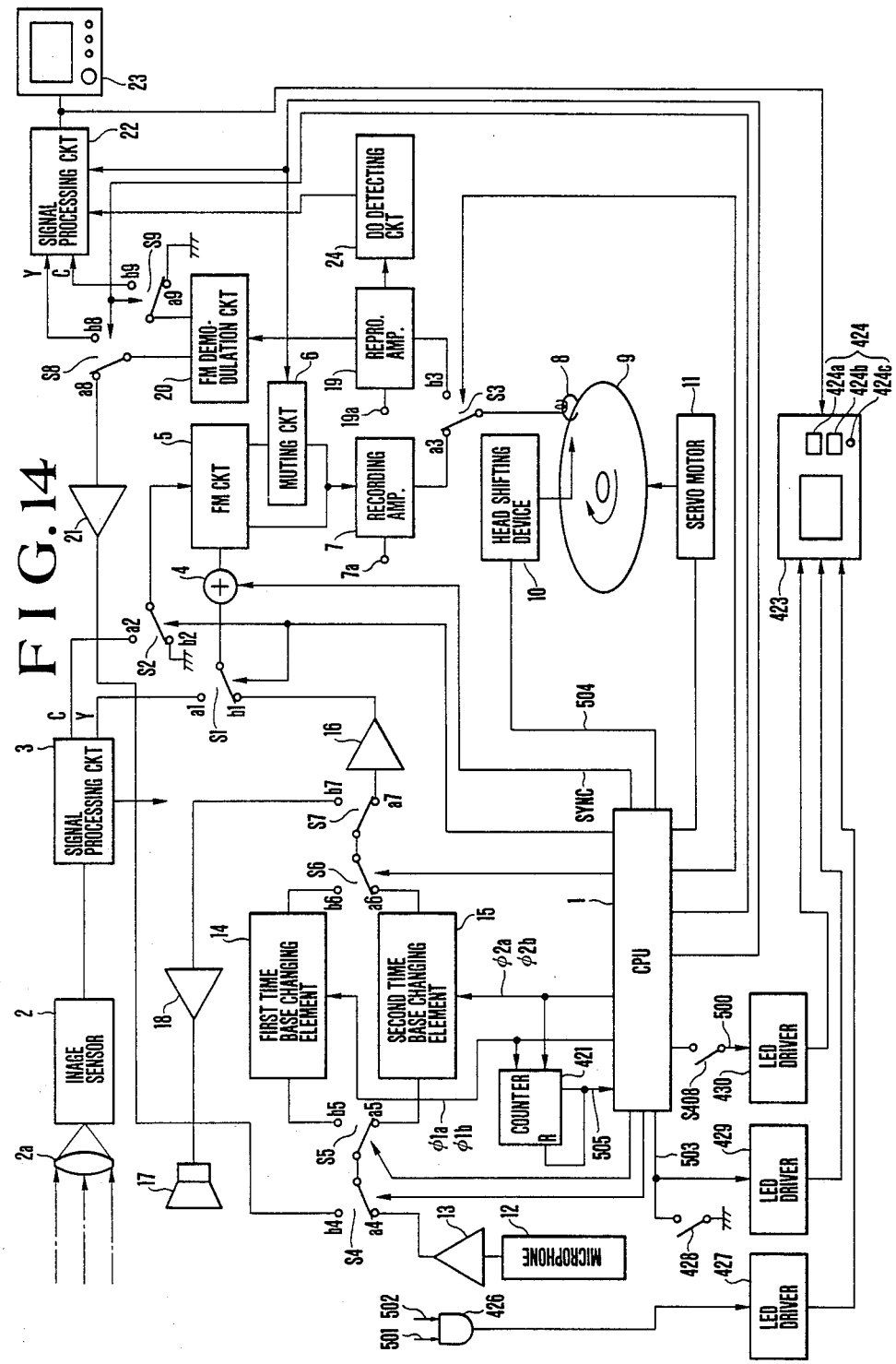
FIG. 14 is a block diagram showing the arrangement of a fourth embodiment of this invention.
Figure 15:
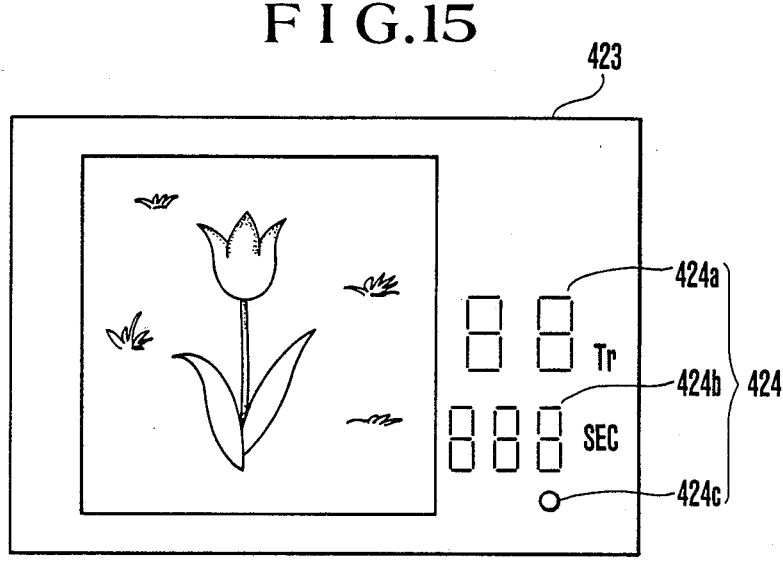
FIGS. 15 and 16 show by way of example displays made by the fourth embodiment of this invention.

A fourth embodiment of this invention is capable of making an apposite display of a state in which sounds are recorded during the process of sound recording. The fourth embodiment is arranged as shown in FIG. 14. In FIG. 14, the parts which are arranged in the same manner as those shown in FIG. 1 are indicated by the same reference numerals as in FIG. 1 and details of them are omitted from the following description: Referring to FIG. 14, display means 424 is arranged within an electronic view finder 423 (hereinafter referred to as EVF for short). As shown in FIG. 15, the display means 424 includes a time display LED 424a which is composed of seven-segment LEDs arranged to show a recordable length of time; a track display LED 424b which is composed of seven-segment LEDs arranged to show a track number designated in performing a recording or reproducing operation; and recording display LED 424c arranged to show whether a recording operation is in process. A counter 421 is arranged to count the incoming driving pulses $\phi 1b$ and $\phi 2b$. The output of the counter 421 is arranged to be supplied to the CPU 1 and also to the reset terminal R thereof. In response to this input, the CPU 1 produces a time signal 500 and supplies it to an LED driver 430. An AND gate 426 is arranged to receive a change-over signal 501 for the switches S3, S4 and S7 and another change-over signal 502 for the switches S8 and S9. An LED driver 427 is arranged to light up the recording display LED 424c in response to a signal from the AND gate 426. A switch 428 is arranged to supply the CPU 1 with a tracking instruction 503 which designates a recording or reproducing track. An LED driver 429 is arranged to drive the track display LED 424a in response to the tracking instruction 503. Another LED driver 430 is arranged to drive the recording time display LED 424b in response to the recording time signal 500 which comes via the switch S8. For each of the two LED drivers 429 and 430, a known BCD to 7-segment decoder driver IC can be used.

With the fourth embodiment arranged as described above, it operates as follows: In performing a recording or reproducing operation, the tracking instruction 503 is supplied via the switch 428 to the CPU 1 and the LED driver 429 to have the magnetic head 8 moved to a desired track. The CPU 1 then compares the track designated by the instruction 503 with a track at which the head is presently located. Then a tracking pulse signal 504 for shifting the head either in the forward or reverse direction is supplied to the head shifting device 10. The head is correctly positioned. At the same time, the LED driver 429 drives the track display LED 424a in accordance with the tracking instruction 503 to cause the LED 424a to display the track number designated.

In recording an audio signal, the embodiment operates in a manner similar to the first embodiment. In the case of the fourth embodiment, however, during the audio signal recording or reproducing process, the counter 421 counts the driving pulses $\phi 1b$ and $\phi 2b$ being supplied to the time base changing elements 14 and 15. When a predetermined count value is obtained, the counter produces and supplies one pulse as a time signal 505 to the CPU 1 and to the reset terminal R thereof. Assuming that a 1-H portion of the signal is read out from the time base changing elements 15 and 14 by each driving pulse $\phi 1b$ and $\phi 2b$, for example, about a length of 63.5 $\mu$sec of the signal is recorded on the magnetic sheet 9. With the rate of compression by the time base changing elements 15 and 14 assumed to be 1/1000 as mentioned in the foregoing, the amount of time over which the audio signal recorded is becomes 63.5 $\mu$sec $\times 1000$ =63.5 msec. Accordingly, with 16 driving pulses $\phi 1b$ and $\phi 2b$ applied, the value becomes:

$$16 \times 63.5 \text{ msec} = 1.016 \text{ sec} \ldots \tag{1}$$

About one sec portion of the audio signal is thus recorded. When 16 driving pulses φ1b and φ2b are counted by the counter 421, the counter 421 supplies one pulse as the time signal 505 to the CPU 1 and also to the reset terminal R. The counter 421 is reset. Upon receipt of the time signal 505, the CPU 1 increases the value of its register by 1, for example. This indicates that about one sec of recording time has elapsed. The CPU 1 supplies the value of the register, as the signal 500, to the LED driver 430 always in synchronism with the clock pulses of the CPU 1. This value is displayed at the time display LED 424.

Further, when the magnetic head 8 is shifted to a new track by the head shifting device 10 as mentioned in the foregoing, the initial state of the register within the CPU 1 may be set at a length of time required for writing in one track. For example, it is set at 16 sec. The set value of the register is then decreased by one every time the pulse is received from the counter 421. Such arrangement enables the time display LED 424b to display a remaining length of recordable time. The operator of the embodiment is thus enabled to easily know by looking at the EVF 423 how long the recording has continued or how much time is left for further recording.

The change-over signals 501 and 502 produced from the CPU 1 are also supplied to the AND gate 426. When the change-over signals 501 and 502 are at high levels, the switches S1, S3, S4 and S7 are connected to their terminals b1, a3, a4 and a7 respectively. Then, a high level signal which is produced from the AND gate 426 is supplied to the LED driver 427. This causes the recording display LED 424c to light up. This enables the operator to readily know whether the embodiment is recording.

As indicated by Formula (1) above, the recording time display has an error of 16 msec. However, since this display does not have to be exact for the operator, this degree of error presents no problem. In cases where more precise display is necessary, a timer may be arranged within the CPU 1 to be used for a display of recording time by triggering the LED 424c.

An audio signal reproducing operation is performed as follows:

First, a tracking instruction 503 is supplied from the switch 428 to the CPU 1 designating a reproducing track in the same manner as in the case of recording. The magnetic head 8 is moved to the track designated. The track display LED 424a displays the track number designated in the same manner as in the case of recording. When operation means which is not shown is operated after that, the CPU 1 produces the change-over signals 501 and 502 to shift the connecting positions of the switches S3, S4, S7 and S8 to their terminals b3, b4, b7 and a8 respectively. Following this, the reproducing operation is performed in the same manner as described in the foregoing.

Figure 16:
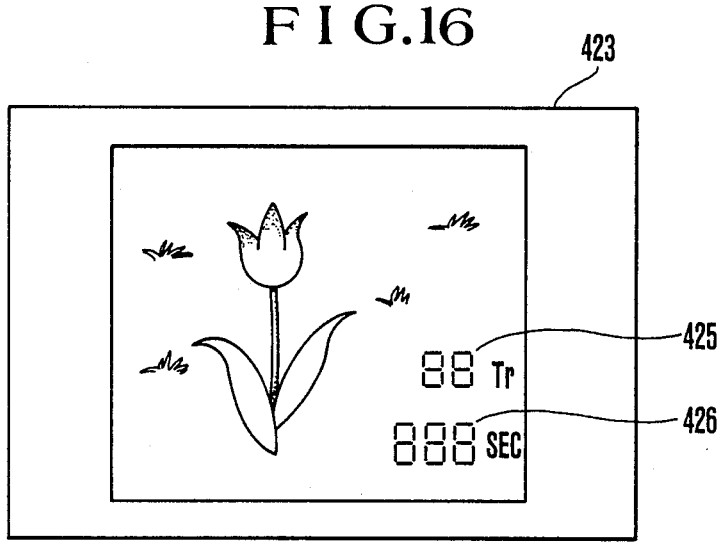

In the case of the fourth embodiment, displays are arranged to be made by the LEDs 424a, 424b and 424c which are disposed on one side of an image plane within the EVF 423. However, this arrangement may be changed to have a track display 425, a time display 426, etc. superimposed on the image plane of the EVF 423 as shown in FIG. 16. Further, the counter which counts the driving pulses φ1b and φ2b may be disposed within the CPU 1. Further, the use of two time base changing elements may be changed to more than two elements. This invention is applicable not only to an apparatus using a single magnetic head for recording and reproduction of video and audio signals as in the case of the embodiment described but is also to other apparatuses of the kind using a plurality of magnetic heads, such as apparatuses having an in-line head or having an additional head discretely provided for audio signals. Further, the invention is also applicable to an apparatus of the kind arranged to form a helical track on the magnetic sheet 8.

As described above, this embodiment is capable of recording and reproducing an audio signal by carrying out band compression and expansion without necessitating the A/D and D/A converting processes which has been indispensable with a conventional apparatus. Further, the embodiment permits a reduction in the number of parts to a great extent for reduction in cost. It is an advantageous feature of this embodiment that the accurate and reliable displays of recording and reproducing conditions enhances the operability of the apparatus.

What is claimed is:

1. An apparatus for recording an audio signal on a medium, comprising:
   (a) a recording head;
   (b) driving means for driving the medium relative to said recording head, said driving means requiring a predetermined period of time after commencement of the driving operation thereof before bringing the medium and said recording head into a given recordable positional relation; and
   (c) a time base compressing element for compressing a given audio signal on a time base axis, said element being arranged to store the given audio signal during the predetermined period.

2. An apparatus according to claim 1, further comprising generating means for generating said audio signal, said means being arranged to time serially generate said audio signal.

3. An apparatus according to claim 2, wherein said audio signal generating means includes a microphone.

4. An apparatus according to claim 1, wherein said medium is in a disc-like shape and said driving means is arranged to rotate said medium.

5. An apparatus according to claim 1, further comprising means for feeding an audio signal compressed by said time base compressing element to said recording head.

6. An apparatus according to claim 1, wherein said time base compressing element is arranged to effect the time base compression by changing the speed of storing the given audio signal and the speed of reading the stored given audio signal.

7. An apparatus according to claim 1, wherein said recording head is a magnetic recording head.

8. An apparatus according to claim 1, wherein the audio signal is an analog audio signal.

9. An apparatus for recording an audio signal and/or an image signal on a medium, comprising:
   a) a recording head;
   b) driving means for driving the medium relative to said recording head, said driving means requiring a predetermined period of time after commencement of the driving operation thereof before bringing the medium and said recording head into a given recordable positional relation;
   c) signal generating means for generating an image signal to be recording by said head;
   d) a time base changing element for compressing a given audio signal on a time base axis, said element being arranged to store the given audio signal during the predetermined period; and e) signal supplying means for selectively supplying the image signal supplied by said signal generating means or the audio signal compressed on the time base axis by said time base changing element to said recording head.

10. An apparatus according to claim 9, wherein said signal generating means generates an image signal to be recorded without being compressed on the time base axis.

11. An apparatus according to claim 9, wherein aid signal generating means includes:
converting means for converting an image of an object into an image signal thereof.

12. An apparatus according to claim 9, further comprising a plurality of said time base changing elements.

13. An apparatus according to claim 9, wherein said signal supplying means includes FM modulating means for effecting FM modulation of a signal selected from the image signal and the audio signal time axis compressed by said time base changing element.

14. An apparatus according to claim 9, further comprising:
detecting means for detecting whether the drive state of said driving means is in a predetermined state, wherein said signal generating means supplies the time-axis compressed audio signal compressed by said time base changing element in response to the output of said detecting means.

15. An apparatus according to claim 9, wherein said time base compressing element is arranged to effect time base compression by changing the speed of storing the given audio signal and the speed of reading the stored given audio signal.

16. An apparatus according to claim 9, wherein said recording head is a magnetic recording head.

17. An apparatus according to claim 9, wherein said recording head is a magnetic recording head.

18. An apparatus for recording and/or reproducing an audio signal on a medium, comprising:

a) a recording and/or reproducing head;

b) driving means for driving the medium relative to said recording head, said driving means requiring a predetermined period of time after commencement of the driving operation thereof before bringing the medium and said recording head into a given recordable positionable relation;

c) a time base changing element for changing a given audio signal on a time base axis, said element being arranged to store the given audio signal during the predetermined period; and d) feeding means for feeding the signal reproduced from the medium by said recording and/or reproducing head to said time base changing element.

19. An apparatus according to claim 18, wherein the time base axis is extended when the reproduced signal is fed by said feeding means to said time base changing element.

20. An apparatus according to claim 18, further comprising generating means for generating the audio signal, said generating means being arranged to time serially generate the audio signal.

21. An apparatus according to claim 20, wherein said audio signal generating means includes a microphone.

22. An apparatus according to claim 18, wherein the medium is in a disc-like shape and said driving means is arranged to rotate the medium.

23. An apparatus according to claim 18, wherein said recording head is a magnetic recording head.

24. An apparatus according to claim 18, wherein the audio signal is an analog audio signal.

25. An apparatus according to claim 18, wherein said time base changing element is arranged to effect the time base changing operation by changing the speed of storing the given audio signal and the speed of reading the stored given audio signal.

26. An apparatus according to claim 18, further comprising means for feeding the audio signal changed by said time base changing element to said recording head.

* * * * *

UNITED STATES PATENT AND TRADEMARK OFFICE
CERTIFICATE OF CORRECTION

PATENT NO. : 4,912,570
DATED : March 27, 1990
INVENTOR(S) : Takao Kinoshita et al.

It is certified that error appears in the above-identified patent and that said Letters Patent is hereby corrected as shown below:

COLUMN 2:

Line 68, "or" should be deleted.

COLUMN 7:

Line 48, "cording" should read --cording to--.

COLUMN 8:

Line 29, "convertional" should read --conventional--.

COLUMN 9:

Line 32, "track:" should read --track.--.

Line 41, "circuit 103a" should read --circuit 103b--.

UNITED STATES PATENT AND TRADEMARK OFFICE
CERTIFICATE OF CORRECTION

PATENT NO. : 4,912,570
DATED : March 27, 1990
INVENTOR(S) : Takao Kinoshita et al.

It is certified that error appears in the above-identified patent and that said Letters Patent is hereby corrected as shown below:

COLUMN 12:

Line 1, "(EMP) circuit 103b," should read --(EMP) circuit 103c,--.

Line 4, "C processing circuit 103b," should read --signal C processing circuit 103b,--.

Line 45, "chroninance signal C." should read --chrominance signal C.--.

Line 47, "120a supplied" should read --120a is supplied--.

Line 62, "1-H deley line 121b1." should read --1-H display line 121b1.--.

COLUMN 13:

Line 18, "flow chart;" should read --flow chart.--.

Line 26, "is" (second occurrence) should read --are--.

Line 53, "916" should be deleted.

UNITED STATES PATENT AND TRADEMARK OFFICE
CERTIFICATE OF CORRECTION

PATENT NO. : 4,912,570

DATED : March 27, 1990

INVENTOR(S) : Takao Kinoshita et al.

It is certified that error appears in the above-identified patent and that said Letters Patent is hereby corrected as shown below:

COLUMN 14:

Line 7, "aler" should read -- alter- --.

Line 64, "controller 28," should read --controller 28--.

COLUMN 15:

Line 51, "servo circuit 11a" should read --servo circuit 111a--.

COLUMN 16:

Line 38, "FIG. 11:" should read --FIG. 11.--.

COLUMN 17:

Line 20, "reproduction both" should read --reproduction of both--.

UNITED STATES PATENT AND TRADEMARK OFFICE
CERTIFICATE OF CORRECTION

PATENT NO. : 4,912,570

DATED : March 27, 1990

INVENTOR(S) : Takao Kinoshita et al.

It is certified that error appears in the above-identified patent and that said Letters Patent is hereby corrected as shown below:

COLUMN 19:

Line 24, "phaee" should read --phase--.

Line 26, "S302.(for" should read --S302 (for--.

Line 38, "is" should read --are--.

COLUMN 20:

Line 32, "th" should read --the--.

Line 63, "become" should read --come--.

COLUMN 22:

Line 2, "description:" should read --description.--.

Line 27, "track display LED 424a" should read --track display LED 424b--.

Line 29, "time display LED 424b" should read --time display LED 424a--.

UNITED STATES PATENT AND TRADEMARK OFFICE
CERTIFICATE OF CORRECTION

PATENT NO. : 4,912,570
DATED : March 27, 1990
INVENTOR(S) : Takao Kinoshita et al.

It is certified that error appears in the above-identified patent and that said Letters Patent is hereby corrected as shown below:

Line 45, "track display LED 424a" should read --track display LED 424b--.

Line 47, "LED 424a" should read --LED 424b--.

COLUMN 23:

Line 12, "time display LED 424." should read --time display LED 424a--.

Line 20, "time display LED 424b" should read --time display LED 424a--.

Line 49, "track display LED 424a" should read --track display LED 424b--.

COLUMN 24:

Line 9, "sheet 8." should read --sheet 9.--.

Line 13, "has" should read --have--

Line 19, "enhances" should read --enhance--.

UNITED STATES PATENT AND TRADEMARK OFFICE
CERTIFICATE OF CORRECTION

PATENT NO. : 4,912,570

DATED : March 27, 1990

INVENTOR(S) : Takao Kinoshita et al.

It is certified that error appears in the above-identified patent and that said Letters Patent is hereby corrected as shown below:

Line 36, "time serially" should read --time-serially--.

COLUMN 25:

Line 12, "aid" should read --said--.

Lines 41 and 42, delete.

COLUMN 26:

Line 9, "positionable" should read --positional--.

Line 23, "time seri-"should read -- time-seri- --.

Signed and Sealed this

Thirtieth Day of June, 1992

*Attest:*

DOUGLAS B. COMER

*Attesting Officer*     *Acting Commissioner of Patents and Trademarks*